(12) United States Patent
Kanai et al.

(10) Patent No.: US 10,223,037 B2
(45) Date of Patent: Mar. 5, 2019

(54) MEMORY DEVICE INCLUDING CONTROLLER FOR CONTROLLING DATA WRITING USING WRITING ORDER CONFIRMATION REQUEST

(71) Applicant: TOSHIBA MEMORY CORPORATION, Minato-ku, Tokyo (JP)

(72) Inventors: Tatsunori Kanai, Yokohama (JP); Tetsuro Kimura, Tama (JP); Masaya Tarui, Yokohama (JP); Yusuke Shirota, Yokohama (JP); Shiyo Yoshimura, Kawasaki (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 0 days.

(21) Appl. No.: 15/051,847

(22) Filed: Feb. 24, 2016

(65) Prior Publication Data
US 2016/0283157 A1 Sep. 29, 2016

(30) Foreign Application Priority Data
Mar. 23, 2015 (JP) .................................. 2015-059768

(51) Int. Cl.
*G06F 3/06* (2006.01)
(52) U.S. Cl.
CPC ............ *G06F 3/0679* (2013.01); *G06F 3/064* (2013.01); *G06F 3/0619* (2013.01)
(58) Field of Classification Search
CPC ....... G06F 3/0679; G06F 3/0619; G06F 3/064
See application file for complete search history.

(56) References Cited

U.S. PATENT DOCUMENTS

| | | | | |
|---|---|---|---|---|
| 4,783,730 A * | 11/1988 | Fischer | ................. | G06F 15/167 710/5 |
| 6,216,174 B1 * | 4/2001 | Scott | ......................... | G06F 9/52 712/10 |
| 6,721,813 B2 * | 4/2004 | Owen | ................. | G06F 13/4243 710/107 |
| 8,533,404 B2 | 9/2013 | Condit et al. | | |
| 9,755,997 B2 * | 9/2017 | Li | ........................... | H04L 51/04 |
| 2003/0074520 A1 * | 4/2003 | Weber | ................... | G06F 9/5016 711/105 |
| 2007/0005868 A1 * | 1/2007 | Osborne | ............. | G06F 13/1673 710/310 |
| 2011/0208915 A1 * | 8/2011 | Bannon | ................. | G06F 9/3004 711/122 |

(Continued)

*Primary Examiner* — David Yi
*Assistant Examiner* — Nicholas A. Paperno
(74) *Attorney, Agent, or Firm* — Oblon, McClelland, Maier & Neustadt, L.L.P.

(57) ABSTRACT

According to an embodiment, a memory device includes a nonvolatile memory and a controller. The controller receives, from a host device, a write request for writing data in the nonvolatile memory, and then performs data writing based on the write request. When a writing order confirmation request, which is issued for confirmation of fact that data writing is performed based on one or more of the write requests that are already sent, is received from the host device, the controller performs data writing based on the write requests received before receiving the writing order confirmation request and then sends to the host device a response with respect to the writing order confirmation request.

17 Claims, 24 Drawing Sheets

(56) References Cited

U.S. PATENT DOCUMENTS

| | | | |
|---|---|---|---|
| 2013/0227236 A1* | 8/2013 | Flynn | G11C 16/26 711/165 |
| 2014/0331001 A1* | 11/2014 | Liu | G06F 3/0659 711/103 |
| 2014/0365734 A1* | 12/2014 | Bridge, Jr. | G06F 12/0891 711/144 |
| 2015/0033234 A1* | 1/2015 | Shacham | G06F 9/522 718/102 |

* cited by examiner

FIG.5

| 64-BYTE READ REQUEST | 7 | 21B498 | CRC |

FIG.6

| 64-BYTE READ RESPONSE | 7 | 48 BD ··· 53 A4 | CRC |

FIG.7

| ORDERING REQUEST | 5 | CRC |

FIG.8

| ORDERING RESPONSE | 5 | CRC |

FIG.21

| 64-BYTE WRITE REQUEST | 4 | 108A0 | 8F 42 ··· 0B 9D | CRC |

FIG.22

| WRITE RESPONSE | 4 | CRC |

FIG.36

| COMMAND INFORMATION | TAG INFOR- MATION | GROUP ID | ADDRESS INFORMATION | DATA | CRC |

FIG.37

| ORDERING REQUEST | 7 | 5 | CRC |

# MEMORY DEVICE INCLUDING CONTROLLER FOR CONTROLLING DATA WRITING USING WRITING ORDER CONFIRMATION REQUEST

CROSS-REFERENCE TO RELATED APPLICATIONS

This application is based upon and claims the benefit of priority from Japanese Patent Application No. 2015-059768, filed on Mar. 23, 2015; the entire contents of which are incorporated herein by reference.

FIELD

Embodiments described herein relate generally to a memory device.

BACKGROUND

In a computer system having the main memory in the form of a byte-addressable nonvolatile memory such as a magnetoresistive random access memory (MRAM), a phase-change memory (PCM), or a memristor that is directly connectible to the memory bus of a processor; in order to make sure that, in case there occurs a failure, the operations are continued from the consistent state immediately prior, to the failure, it becomes necessary to ensure that computer programs executed in the processor follow ordering and atomicity (the property that writing is not terminated midway) of the writing performed with respect to the nonvolatile memory.

For example, as a technology for ensuring that the ordering is followed, a technology is known in which the data written by the processor in the nonvolatile memory is divided into groups called epochs that are identified by generation numbers, and control is performed in such a way that the order of write-back from a cache memory to the nonvolatile memory follows the order of epochs.

Moreover, in recent years, memory devices (such as the Hybrid Memory Cube (HMC) or memory devices establishing connection using the QuickPath Interconnect (QPI)) have been developed in which not only the memory has a high operation speed but also a controller is installed for controlling the writing of data in the memory. The target data for writing that is sent from the memory controller of a processor to a memory device firstly goes to the controller in the memory device before being written in the memory.

However, in a memory device having a controller built-in, the following possibility arises: due to a delay occurring in the controller or due to the optimization of the writing order, writing of the data in a nonvolatile memory occurs in a different writing order than the writing order expected by the processor for writing data in a nonvolatile memory. For that reason, it is not possible to ensure that the ordering is followed.

BRIEF DESCRIPTION OF THE DRAWINGS

FIG. 5 is a diagram illustrating an exemplary read request according to the first embodiment;

FIG. 6 is a diagram illustrating an exemplary response given with respect to a read request according to the first embodiment;

FIG. 7 is a diagram illustrating an exemplary writing order confirmation request according to the first embodiment;

FIG. 8 is a diagram illustrating an exemplary response given with respect to a writing order confirmation request according to the first embodiment;

FIG. 21 is a diagram illustrating an exemplary non-posted write request according to a second embodiment;

FIG. 22 is a diagram illustrating an exemplary response with respect to a non-posted write request according to the second embodiment;

FIG. 36 is a diagram illustrating an exemplary format of a request according to an eighth embodiment;

FIG. 37 is a diagram illustrating an example of a writing order confirmation request according to the eighth embodiment;

DETAILED DESCRIPTION

Figure 1:
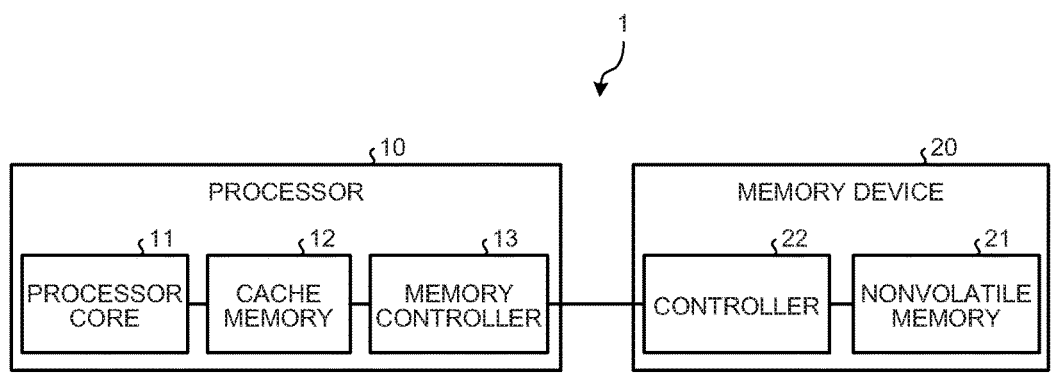
FIG. 1 is a diagram illustrating an exemplary configuration of an information processing device according to a first embodiment.

According to an embodiment, a memory device includes a nonvolatile memory and a controller. The controller receives, from a host device, a write request for writing data in the nonvolatile memory, and then performs data writing based on the write request. When a writing order confirmation request, which is issued for confirmation of fact that data writing is performed based on one or more of the write requests that are already sent, is received from the host device, the controller performs data writing based on the write requests received before receiving the writing order confirmation request and then sends to the host device a response with respect to the writing order confirmation request.

Various embodiments are described below in detail with reference to the accompanying drawings.

First Embodiment

Prior to explaining the specific details, given below is the general description of embodiments along with the explanation of the conventional technology. In a computer system having the main memory (main memory device) in the form of a byte-addressable nonvolatile memory such as a magnetoresistive random access memory (MRAM), a phase-change memory (PCM), or a memristor that is directly connectible to the memory bus of a processor; even if there occurs an unexpected power failure or an unexpected hardware error, when the computer system is rebooted after resolving the failure or the error, the operations can be continued from the consistent state immediately prior to the failure or the error by referring to the state (data) left in the nonvolatile memory (main memory). Therefore, the computer programs running in the processor perform data writing in the nonvolatile memory in a fixed order so that, regardless of the timing of the failure or the error, the consistent state immediately prior to the failure or the error can be always reproduced.

For example, when an update log of a database is managed as a linked list in the nonvolatile memory, it is necessary to perform an operation for writing the update log of individual transactions in the log entry and an operation for linking the log entries to the linked list. If this order of operations is not followed, then there occurs a situation in which an incomplete log entry that has not been completely written gets linked to the linked list. In case a failure occurs at that point of time, the post-rebooting database recovery is done based on the incomplete log, thereby damaging the database consistency.

However, even if a computer program running in the processor performs data writing in the nonvolatile memory according to the fixed order, the data to be written in the nonvolatile memory actually passes through the cache memory, the write buffer, and the memory controller of the processor. Thus, prior to the data writing in the nonvolatile memory, there occurs shuffling of the writing order or there occurs a writing delay. That results in an ordering problem in which the data writing in the nonvolatile memory does not follow the order expected by the computer program. As one of the conventional methods proposed to solve the ordering problem, a control method called epoch barrier is known in which the data written by the processor in the nonvolatile memory is divided into groups called epochs that are identified by generation numbers, and control is performed in such a way that the order of write-back from a cache memory to the nonvolatile memory follows the order of epochs.

In the case of a memory device (a memory module) such as a dual in-line memory module (DIMM) installed with a dynamic random access memory (DRAM) of the double data rate (DDR) type, the timing of writing to be done in the memory (a chip or a die) in the memory device is controlled by the memory controller of the processor that is connected to the memory device. Hence, the memory controller can control the order of data writing as well as recognize the completion of data writing. However, along with the enhancement in the operation speed of the memory, memory devices having a controller installed therein for controlling data writing with respect to the memory are appearing on the scene. Examples of such memory devices include the Hybrid Memory Cube (HMC); a memory device establishing connection using the QuickPath Interconnect (QPI); and a memory device establishing connection using the dedicated buses of various processors (i.e., a device formed by combining a memory controller and a memory) (in the embodiments described below, any of the abovementioned types can be used).

In a processor that is connected to a memory device installed with a controller for controlling the data writing with respect to the memory, when the data (the target data for writing) is completely sent to the memory device, the memory controller of the processor recognizes that the data writing is completed. However, the target data for writing that is sent to the memory device is written in the memory only after passing through the controller in the memory device. Hence, at the point of time at which the memory controller in the processor recognizes that the data writing is completed, there is no guarantee that the target data for writing has reached the memory cells in the memory. Moreover, the controller installed in the memory device optimizes the order of data writing (changes the order of data writing), and then writes the data in the memory cells of the nonvolatile memory and makes the data persistent.

There are various methods by which the controller installed in the memory device can optimize the order of data writing. A first optimization method can be to integrate writing with respect to the same row page. Generally, in a nonvolatile memory in which a plurality of memory cells are arranged in a matrix-like manner corresponding to the intersections of a plurality of word lines extending in the row direction with a plurality of bit lines extending in the column direction; of the address information used in specifying the positions of the memory cells, the upper bit portion is used as row addresses (addresses in the row direction) and the lower bit portion is used as column addresses (addresses in the column direction). Then, at the time of accessing the nonvolatile memory, firstly a row address is specified so as to specify a row page (herein, the data size equivalent to a plurality of memory cells connected to a single word line is referred to as a "row page"), and a read operation (data reading) or a write operation (data writing) is performed with respect to that row page. As a result of continuously performing read accesses or write accesses having the same row address, it becomes possible to reduce the number of times for which the row page is opened (also called activated) and closed (also called pre-charged), and to reduce the period of time required for those operations. Hence, the order of read requests or write requests that are received is changed in such a way that the same row page is continuously accessed as much as possible.

In a second optimization method, when a plurality of nonvolatile memories are embedded in a memory device and when operations (reading and writing) can be performed in parallel with respect to the nonvolatile memories; when a request for reading or writing is received, if the nonvolatile memory to be accessed is in the operable state (for example, not being subjected to a read operation or a write operation), the controller immediately starts accessing that nonvolatile memory. However, if the nonvolatile memory to be accessed is being subjected to an operation in response to another request, then the controller puts the request in a queue and keeps it waiting. Hence, the writing order with respect to the nonvolatile memories differs from the order in which the controller receives the requests. When a plurality of memory devices is connected to a processor, the change in the order as explained in the second optimization method can occur among different memory devices too. That is, assume that the processor issues a write request (a first write request) to a first memory device for writing data in a nonvolatile memory, and then issues a write request (a second write request) to a second memory device. However, if the first memory device that receives the first write request is already performing data writing based on a write request received previously, and if the second memory device that receives the second write request is in the idle state (not performing any operations); then the data writing according to the second write request is completed earlier than the data writing according to the first write request that is issued earlier than the second write request.

The order of writing with respect to the nonvolatile memory as followed by the controller installed in a memory device is basically the order of receipt. In contrast, it is possible to determine the order according to the first optimization method, the second optimization method, or a combination of those optimization methods. Alternatively, it is also possible to combine other optimization methods other than the first optimization method and the second optimization method.

In this way, in the case of a memory device having a controller built-in, due to a delay in the controller or due to the optimization of the writing order, writing of the data in a nonvolatile memory occurs in a different writing order than the writing order expected by the processor for writing data in a nonvolatile memory. For that reason, it is not possible to ensure that the ordering is followed.

In a first embodiment, in a memory device including a controller and one or more nonvolatile memories, a mechanism is provided by which changes in the writing order in the controller are controlled and it is ensured that the data writing in the memory cells of the nonvolatile memories occurs according to the order specified by a processor (or a computer program running in the processor) that is connected to the memory device. More particularly, a mechanism for ensuring the ordering is implemented using a command (an ordering request (described later)) for confirmation of the fact that the data writing in response to write requests received by the memory device till a particular point of time (i.e., writing in memory cells of the nonvolatile memories) is completed and that the data is persistent.

The specific contents of the first embodiment are described below in detail with reference to the accompanying drawings.

FIG. 1 is a diagram illustrating an exemplary hardware configuration of an information processing device 1 according to the first embodiment. For example, the information processing device 1 can be configured with a server computer, a personal computer (PC), a handheld information terminal (also considering a portable tablet), or a cellular phone. As illustrated in FIG. 1, the information processing device 1 includes a processor 10 and a memory device 20 (a memory module (identical in other embodiments too)). In the example illustrated in FIG. 1, the memory device 20 has a single access port to which the processor 10 is connected. However, that is not the only possible case.

The processor 10, which is an example of a host device, includes a processor core (also called a central processing unit (CPU)) 11, a cache memory 12, and a, memory controller 13.

Regarding the sequence of operations by which a computer program executed by the processor core 11 writes data in the memory device 20; firstly, the target data for writing is written in the cache memory 12. Then, the cache memory 12 instructs the memory controller 13 at an appropriate timing to write the data in the memory device 20. Subsequently, in order to write the data from the cache memory 12 into the memory device 20, the memory controller 13 issues a write request to the memory device 20 at an appropriate timing. A write request represents information for requesting data writing in a nonvolatile memory 21 of the memory device 20. In the first embodiment, the write request at least includes the target data for writing along with information (address information) indicating the positions in the nonvolatile memory 21 of the memory device 20 at which the target data for writing is to be written. As another sequence of operations by which the computer program executed by the processor core 11 writes data in the memory device 20; without using the cache memory 12, an instruction is issued directly to the memory controller 13 to write the data in the memory device 20. Meanwhile, in the case of reading data from the memory device 20, the memory controller 13 follows the instructions from the processor core 11, and issues a read request that represents information for requesting data reading from the nonvolatile memory 21 of the memory device 20. In the first embodiment, a read request at least includes address information indicating the positions in the nonvolatile memory 21 of the memory device 20 at which the target data for reading is stored.

In the first embodiment, after issuing one or more write requests to the memory device 20, the processor 10 issues a writing order confirmation request (in the following explanation, sometimes called an "ordering request") to the memory device 20 (from, for example, the memory controller 13) for confirmation of whether or not data writing based on the one or more issued requests has been performed. For example, after issuing to the memory device 20 one or more write requests included in a first writing set, the processor 10 issues a writing order confirmation request to the memory device for confirmation of the fact that data writing based on the one or more requests included in the first writing set has been performed. Then, only after a response with respect to the writing order confirmation request is received from the memory device 20, the processor 10 issues to the memory device 20 one or more write requests included in a second writing set for which the writing order is fixed to be after the first writing set.

In the first embodiment, after the processor 10 issues a writing order confirmation request to the memory device 20 after having issued one or more write requests included in the first writing set, until a response with respect to the writing order confirmation request is received from the memory device 20, the processor 10 does not issue one or more write requests included in the second writing set. Therefore, without being impacted by the delay occurring in a controller 22 that is installed in the memory device 20 or without being impacted by the optimization of the writing order, it becomes possible to ensure that the data writing based on the second writing set is performed only after the data writing based on the first writing set is completed.

Meanwhile, in the following explanation, when write requests, read requests, and writing order confirmation requests need not be distinguished from each other; sometimes simply the term "requests" is used.

Figure 2:
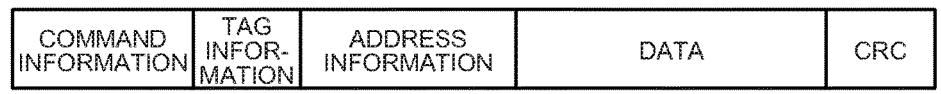
FIG. 2 is a diagram illustrating an exemplary format of a request according to the first embodiment.

FIG. 2 is a diagram illustrating an exemplary format of a request according to the first embodiment. In the example illustrated in FIG. 2, a request includes command information, tag information, address information, data, and a cyclic redundancy code (CRC). The command information is used in identifying the type of the request. The tag information represents information (such as a number) used in associating the request to the response given with respect to the request. The address information indicates the position of the nonvolatile memory 21 of the memory device 20. The data represents, for example, target data for writing in the case in which the request is a write request. The CRC represents information used in verifying whether or not the request could be sent without any error. Some of the types of information may not be present depending on the type of the request. For example, in the case of a read request, the "data" portion is absent. Meanwhile, in addition to the information illustrated in FIG. 2, information indicating the length of the entire request can also be included.

Figure 3:
FIG. 3 is a diagram illustrating an exemplary format of a response according to the first embodiment.

FIG. 3 is a diagram illustrating an exemplary format of a response given with respect to a request according to the first embodiment. In the example illustrated in FIG. 3, a response includes command information, tag information, data, and a CRC. The command information is used in identifying the type of response. The tag information is identical to the tag information included in the corresponding request. The data represents, for example, data obtained as the result of reading in the case in which the response is given with respect to a read request. The CRC represents information used in verifying whether or not the response could be sent without any error. Some of the types of information may not be present depending on the type of the response. For example, in the case of a response given with respect to a write request, the "data" portion is absent. Meanwhile, in addition to the information illustrated in FIG. 3, information indicating the length of the entire response can also be included.

Figure 4:
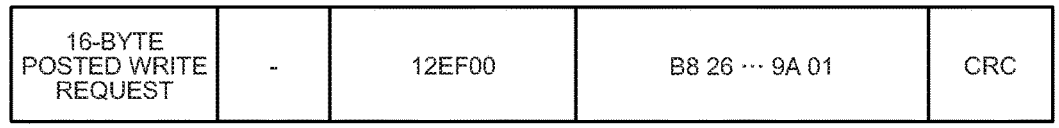
FIG. 4 is a diagram illustrating an exemplary write request according to the first embodiment.

FIG. 4 is a diagram illustrating an exemplary write request according to the first embodiment. Herein, a write request according to the first embodiment is a "posted write request" that does not require a response. However, in the other embodiments described later, a write request can sometimes be a "non-posted write request" that requires a response. In the example illustrated in FIG. 4, writing of 16-byte data is requested as the command information, and information is specified that enables identification of the fact that the request does not require a response after data writing is performed (in the example illustrated in FIG. 4, a "16-BYTE POSTED WRITE REQUEST"). In the example illustrated in FIG. 4, since a response is not required, the tag information is absent. Moreover, in the example illustrated in FIG. 4, "12EF00" is specified as the address information; and 16-byte data "B8, 26, 9A, 01" that is the target for writing is specified as the data. Thus, the write request illustrated in FIG. 4 can be considered to be a posted write request for writing of the 16-byte data "B8, 26, 9A, 01" at the position indicated by the address information "12EF00", and posted is required after the data writing is completed.

FIG. 5 is a diagram illustrating an exemplary read request according to the first embodiment. In the example illustrated in FIG. 5, information enabling identification of the fact that the request is for reading 64-byte data (in the example illustrated in FIG. 5, a "64-BYTE READ REQUEST") is specified as the command information. Moreover, the number "7" is specified as the tag information, and "21B498" is specified as the address information. Thus, the read request illustrated in FIG. 5 can be considered to be a read request for reading 64-byte data from the position indicated by the address information "21B498" in the nonvolatile memory 21 of the memory device 20.

FIG. 6 is a diagram illustrating an exemplary response given with respect to the read request illustrated in FIG. 5. In the example illustrated in FIG. 6, information enabling identification of the fact that the response is given with respect to the read request for reading 64-byte data (in the example illustrated in FIG. 6, a "64-BYTE READ RESPONSE") is specified as the command information. Moreover, in the example illustrated in FIG. 6, information identical to the tag information included in the read request illustrated in FIG. 5 (i.e., the number "7") is specified as the tag information. Furthermore, in the example illustrated in FIG. 6, the address information is absent; and 64-byte data "48, BD, . . . , 53, A4", which represents the result of reading data based on the read request illustrated in FIG. 5, is specified as the data.

FIG. 7 is a diagram illustrating an exemplary writing order confirmation request (an ordering request) according to the first embodiment. More particularly, the writing order confirmation request has the format based on the request format illustrated in FIG. 2. Herein, information enabling identification of the fact that the request is a writing order confirmation request (in the example illustrated in FIG. 7, "ORDERING REQUEST") is specified as the command information. Moreover, in the example illustrated in FIG. 7, the number "5" is specified as the tag information, while the address information and the data are absent.

FIG. 8 is a diagram illustrating an exemplary response given with respect to the writing order confirmation request illustrated in FIG. 7. In the example illustrated in FIG. 8, information enabling identification of the fact that the response is given with respect to the writing order confirmation request (in the example illustrated in FIG. 8, "ORDERING RESPONSE") is specified as the command information. Moreover, in the example illustrated in FIG. 8, information identical to the tag information included in the writing order confirmation request illustrated in FIG. 7 (i.e., the number "5") is specified as the tag information. As a result of using the identical tag information, association between the request and the response is established.

Given below is the explanation of a configuration of the memory device 20 with reference to FIG. 1. As illustrated in FIG. 1, the memory device 20 includes the nonvolatile memory 21 and the controller 22. Herein, the memory device 20 can be considered to be an example of a semiconductor device.

In the first embodiment, the nonvolatile memory 21 is assumed to be configured with a magnetoresistive random access memory (MRAM). However, that is not the only possible case. Alternatively, for example, the nonvolatile memory 21 can be configured with a phase-change memory (PCM), a resistive random access memory (ReRAM), a ferroelectric random access memory (FeRAM), a memristor, or an NVDIMM that is a combination of a dynamic random access memory (DRAM) and a NAND flash. Still alternatively, the nonvolatile memory 21 can be a volatile memory (such as a dynamic random access memory (DRAM) or a static random access memory (SRAM)) having a battery backup.

Figure 9:
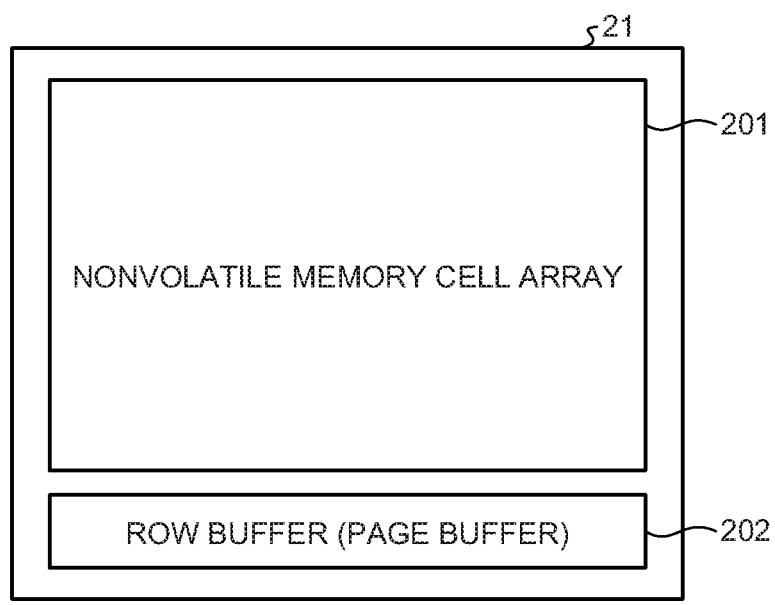
FIG. 9 is a diagram illustrating an exemplary configuration of a nonvolatile memory according to the first embodiment.

FIG. 9 is a diagram illustrating an exemplary overall configuration of the nonvolatile memory 21 according to the first embodiment. As illustrated in FIG. 9, the nonvolatile memory 21 includes a nonvolatile memory cell array 201 and a row buffer (a page buffer) 202 that is a volatile memory.

Although not illustrated in detail in FIG. 9, in the nonvolatile memory cell array 201, a plurality of word lines extending in the row direction (the horizontal direction with reference to FIG. 9) is arranged and a plurality of bit lines extending in the column direction (the vertical direction with reference to FIG. 9) is arranged. Thus, the nonvolatile memory cell array 201 includes a plurality of memory cells arranged in a matrix-like manner corresponding to the intersections of the word lines with the bit lines. Moreover, although not illustrated in detail in FIG. 9, the nonvolatile memory cell array 201 includes a circuit for controlling the voltage of the word lines and a circuit for controlling the voltage of the bit lines under the control of the controller 22. Such a configuration can be implemented using various known configurations. In this example, the data size equivalent to a plurality of memory cells connected to a single word line is referred to as a "page". The row buffer 202 is used to temporarily store the data equivalent to a single page corresponding to the selected word lines during data writing and data reading. In the first embodiment, writing of data in the nonvolatile memory 21 or reading of data from the nonvolatile memory 21 is performed via the row buffer 202. That is same as the known methods.

Returning to the explanation with reference to FIG. 1, the controller 22 receives, from the memory controller 13 of the processor 10, a write request for writing data in the nonvolatile memory 21; and then performs data writing according to the write request. Moreover, the controller 22 receives, from the memory controller 13 of the processor 10, a read request for reading data from the nonvolatile memory 21; and then performs data reading according to the read request.

Furthermore, in the first embodiment, when a writing order confirmation request (an ordering request) is received from the processor 10 for requesting confirmation of whether or not data writing based on one or more requests issued to the memory device 20 has been performed, the controller 22 performs data writing based on the write requests received before receiving the writing order confirmation request and then sends to the processor 10 a response with respect to the writing order confirmation request. The detailed explanation of the controller 22 according to the first embodiment is given later.

Figure 10:
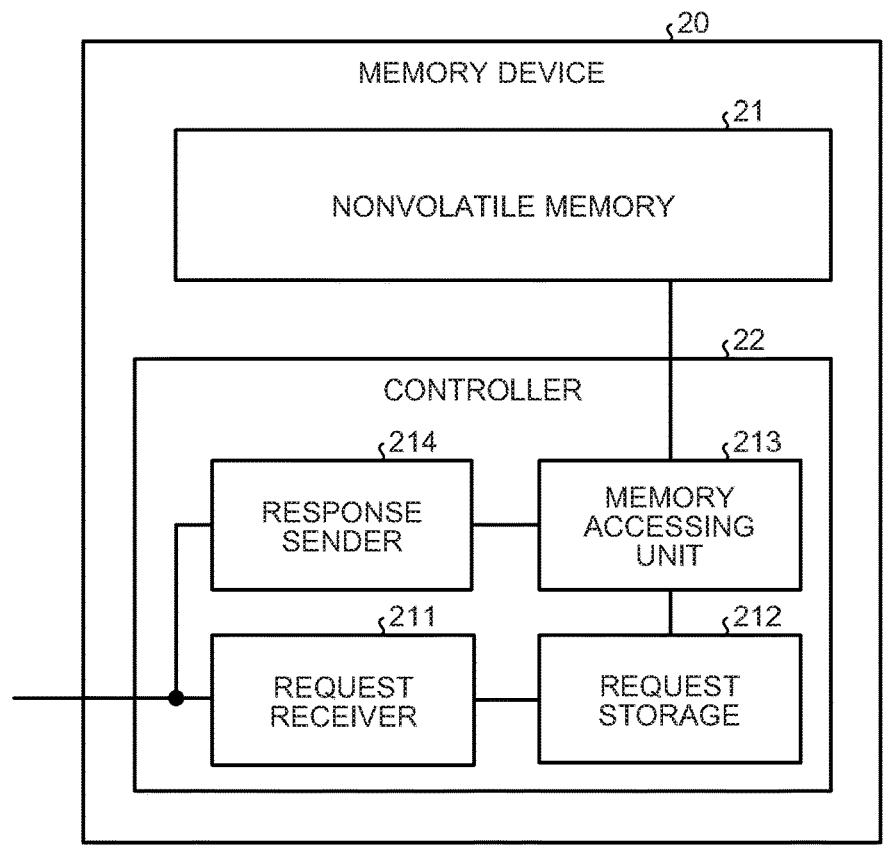
FIG. 10 is a diagram illustrating an exemplary configuration of a memory device according to the first embodiment.

FIG. 10 is a diagram illustrating an exemplary detailed hardware configuration of the memory device 20. As illustrated in FIG. 10, the controller 22 includes a request receiver 211, a request storage 212, a memory accessing unit 213, and a response sender 214. These constituent elements can be configured with a semiconductor circuit. Moreover, these constituent elements either can be installed independently, or two or more arbitrary constituent elements can be integrated.

The request receiver 211 receives a request (a read request, a write request, or a writing order confirmation request) from the processor 10 and records the request in the order of receipt in the request storage 212. Thus, the request storage 212 stores the requests, which are received from the processor 10, in the order of receipt. Herein, for example, the request storage 212 can manage the requests, which are received from the request receiver 211, in their original format. Alternatively, the request storage 212 can manage information, which corresponds to (which is related to) the received requests and which is processed to be in an easy-to-process format for the memory accessing unit 213, as a one-dimensional queue or a linked list in the order of receipt of the requests.

The memory accessing unit 213 sequentially retrieves the requests (or the pieces of information corresponding to the requests) recorded in the request storage 212. If the retrieved requests are write requests, then the memory accessing unit 213 writes data in the nonvolatile memory 21 according to the write requests. If the retrieved requests are read requests, then the memory accessing unit 213 reads data from the nonvolatile memory 21 according to the read request.

In the first embodiment, when a writing order confirmation request is stored in the request storage 212, the memory accessing unit 213 performs data writing based on the write requests older than the writing order confirmation request (i.e., based on the write requests stored in the request storage 212 earlier than storing the writing order confirmation request), and then retrieves the writing order confirmation request and instructs the response sender 214 to send a response with respect to the writing order confirmation request. Thus, the memory accessing unit 213 performs data writing based on the write requests received before receiving the writing order confirmation request, and then instructs the response sender 214 to send a response with respect to the writing order confirmation request. Upon receiving the instruction, the response sender 214 sends to the processor 10 a response with respect to the writing order confirmation request.

Figure 11:
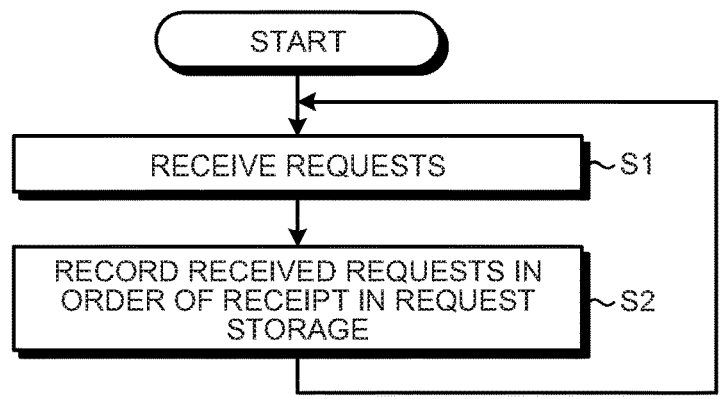
FIG. 11 is a flowchart for explaining an example of the operations performed by a request receiver according to the first embodiment.

FIG. 11 is a flowchart for explaining an example of the operations performed by the request receiver 211. When a request is received from the processor 10 (Step S1), the request receiver 211 stores the received request in the request storage 212 in the order of receipt (Step S2).

Figure 12:
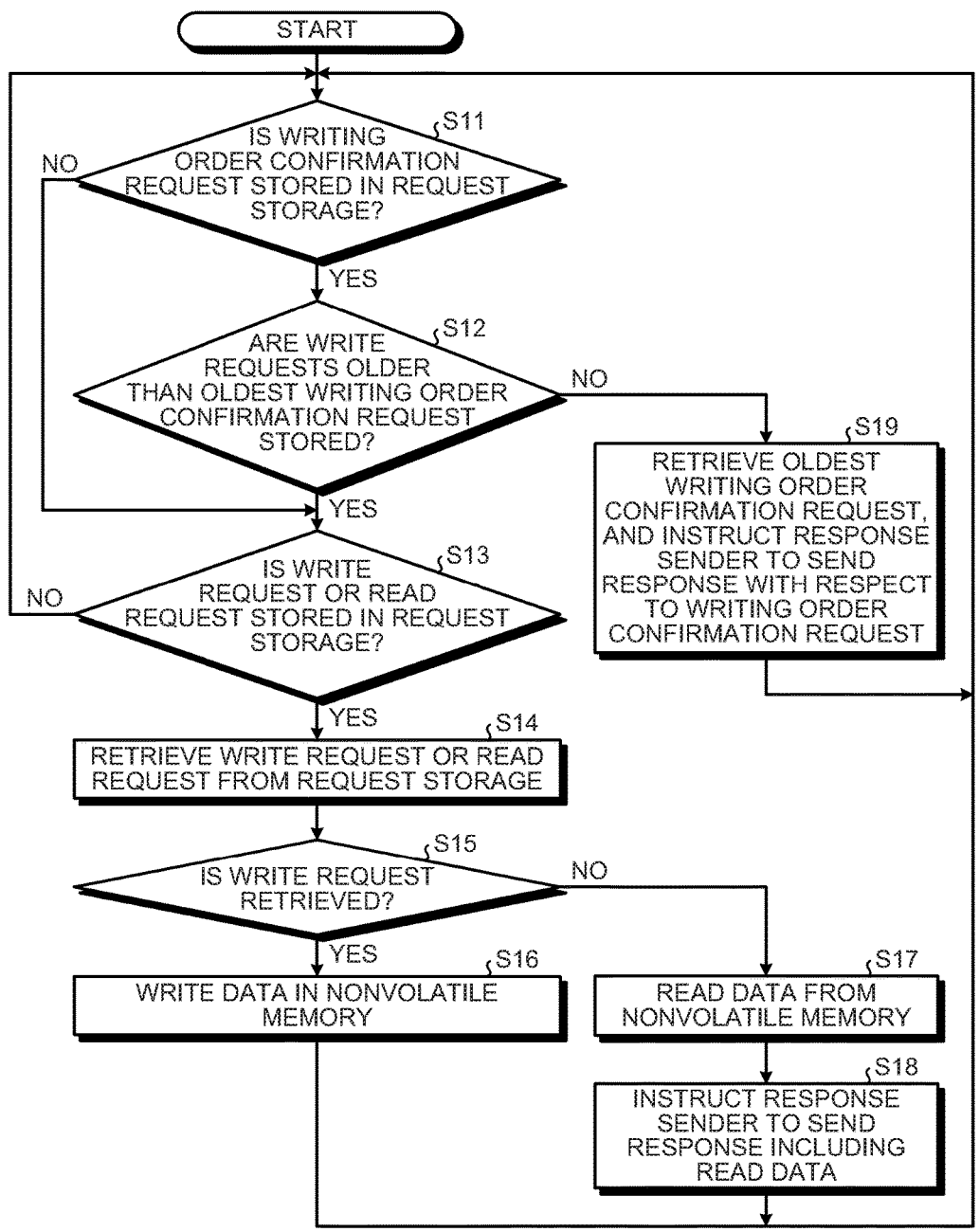
FIG. 12 is a flowchart for explaining an example of the operations performed by a memory accessing unit according to the first embodiment.

FIG. 12 is a flowchart for explaining an example of the operations performed by the memory accessing unit 213. Firstly, the memory accessing unit 213 confirms whether or not a writing order confirmation request (an ordering request) is stored in the request storage 212 (Step S11). If a writing order confirmation request is stored in the request storage 212 (Yes at Step S11), then the memory accessing unit 213 confirms whether the write requests older than the oldest of the writing order confirmation requests are stored in the request storage 212 (Step S12). If the write requests older than the oldest of the writing order confirmation requests are stored (Yes at Step S12) or if no writing order confirmation request is stored in the request storage 212 (No at Step S11), then the system control proceeds to Step S13.

Then, the memory accessing unit 213 confirms whether or not a write request or a read request is stored in the request storage 212 (Step S13). If neither a write request nor a read request is stored in the request storage 212 (No at Step S13), then the system control returns to Step S11. On the other hand, if a write request or a read request is stored in the request storage 212 (Yes at Step S13), then the memory accessing unit 213 retrieves the write request or the read request from the request storage 212 (Step S14). Herein, retrieval of the write request or the read request at Step S14 can be done according to an arbitrary method. The simplest method is to retrieve the oldest request from among the write requests and the read requests stored in the request storage 212. Another method can be to sequentially retrieve the write requests or the read requests issued with respect to, for example, the same row page. Still another method can be to sequentially retrieve the write requests or the read requests issued with respect to the same row page with priority given to the requests that have not been retrieved from the request storage 212 over a certain period of time. Other than these methods, it is also possible to implement various other methods.

If a write request is retrieved at Step S14 (Yes at Step S15), then the memory accessing unit 213 writes data (performs data writing in the nonvolatile memory 21) based on the retrieved write request (Step S16), and the system control returns to Step S11. On the other hand, if a read request is retrieved at Step S14 (No at Step S15), then the memory accessing unit 213 reads data (performs data reading from the nonvolatile memory 21) based on the retrieved read request (Step S17) and instructs the response sender 214 to send a response (with respect to the read request) that includes the read data (Step S18). Upon receiving the instruction, the response sender 214 sends to the processor 10 a response with respect to the read request retrieved at Step S14. Then, the system control returns to Step S11.

Meanwhile, if the write requests older than the oldest of the writing order confirmation requests are not stored (No at Step S12), that is, if data writing based on the write requests that were received before receiving the oldest of the writing order confirmation requests is completed, then the memory accessing unit 213 retrieves the writing order confirmation request from the request storage 212 and instructs the response sender 214 to send a response with respect to the writing order confirmation request (Step S19). Upon receiving the instruction, the response sender 214 sends to the processor 10 a response with respect to the writing order confirmation request. Then, the system control returns to Step S11.

Given below is the explanation of a usage example of the writing order confirmation request (an ordering request) according to the first embodiment. For example, assume that the cache memory 12 is equipped with the epoch barrier described above. In that case, while caching the target data for writing, the cache memory 12 records generation numbers called epochs (or epoch numbers) with respect to the cache lines that represent the units of writing data in the cache memory. Any increment in the epochs is done according to an instruction from the computer program executed by the processor 10. At the time of performing write-back of the cache lines in the nonvolatile memory 21, the memory controller 13 performs control in such a way that, after write-back of all cache lines having a particular epoch number is completed, write-back of the cache lines having the next epoch number is performed. As a result, writing in the nonvolatile memory 21 (in the memory cells of the nonvolatile memory 21) can be performed according to the order expected by the computer program (the order intended by the computer program). In the case of implementing the first embodiment in such a configuration, after write-back of all cache lines having a particular epoch number is completed, the memory controller 13 issues a writing order confirmation request (an ordering request) to the memory device 20. Then, only when a response with respect to the writing order confirmation request is confirmed, the memory controller starts write-back of the cache lines having the next epoch number. As a result, it can be ensured that, only after the data of the cache lines having a particular epoch number is reliably written in the memory cells of the nonvolatile memory 21, the data of the cache lines having the next epoch number is written (in the memory cells of the nonvolatile memory 21).

Meanwhile, the first embodiment can also be implemented in a configuration in which, for example, the computer program running in the processor 10 issues a writing order confirmation request to the memory device 20. For example, assume that a writing set A as well as a writing set B includes one or more write requests with respect to the nonvolatile memory 21 of the memory device 20, and assume that the data based on the writing set B is desirably written only after writing of the data based on the writing set A is reliably completed (i.e., only after the data corresponding to the writing set has been reliably written in the memory cells of the nonvolatile memory 21). As an example, in association with the example of log writing, assume that the writing set A includes requests for writing log entries, while the writing set B includes requests for writing to be done for the purpose of replacing links used in managing the log entries. In this case, in order to write the log using a writing order confirmation request (an ordering request), firstly, the data belonging to the writing set A is written in the cache memory 12, and then a write-back is performed by executing a cache flush instruction corresponding to the written addresses. Subsequently, a writing order confirmation request is sent to the memory device 20, and the response is awaited. Once the response with respect to the writing order confirmation request is confirmed, the data belonging to the writing set B is written in the cache memory 12. Then, as may be necessary, a cache flush instruction is executed with respect to the addresses in which the data belonging to the writing set B is written. Meanwhile, instead of executing a cache flush instruction after writing the data in the cache memory 12, a write instruction can be executed in which writing in the cache is omitted.

Meanwhile, depending on the processor 10, a special instruction is used for confirmation of the fact that the target data for writing has reached the memory cells. For example, a PCOMMIT instruction in the Intel architecture is equivalent to the special instruction mentioned herein. As a result of executing such a special instruction, the processor 10 sends a writing order confirmation request (an ordering request) to the memory device 20 that is connected to the processor 10, and waits for a response before executing the next instruction. With that, it can be ensured that the ordering is followed.

Meanwhile, in the ordering ensuring method according to the first embodiment, even if a plurality of applications running simultaneously in the processor 10, or a plurality of transactions running simultaneously in the processor 10, or a plurality of threads running simultaneously in the processor 10, or a plurality of processors 10 individually issue a writing order confirmation request (an ordering request); it does not lead to any conflict.

As described above, when a writing order confirmation request (an ordering request) is received from the processor 10 for confirmation of the fact that data writing based on one or more write requests that have been sent to the memory device 20 has been performed, the controller 22 of the memory device 20 firstly writes the data based on the write requests received before receiving the writing order confirmation request and then sends to the processor 10 a response with respect to the writing order confirmation request.

For example, in order to ensure that data writing based on the second writing set is performed only after the data writing based on the first writing set is reliably completed (i.e., in order to ensure that the writing order is followed between the first writing set and the second writing set), the processor 10 sends one or more write requests included in the first writing set to the memory device 20 and then sends a writing order confirmation request to the memory device 20. Then, only after a response with respect to the writing order confirmation request is received from the memory device 20, the processor 10 sends one or more write requests included in the second writing set to the memory device 20. That is, after sending one or more write requests included in the first writing set to the memory device 20 and then sending a writing order confirmation request to the memory device 20, the processor 10 does not send one or more write requests included in the second writing set until a response with respect to the writing order confirmation request is received from the memory device 20. Hence, without being impacted by a delay in the controller 22 that is embedded in the memory device 20 or by the optimization of the writing order, it can be ensured that data writing based on the second writing set is performed only after data writing based on the first writing set is completed.

Thus, according to the first embodiment, even in a configuration in which the controller 22 is installed in the memory device 20, it can be ensured that ordering is followed.

First Modification Example of First Embodiment

For example, the memory device 20 can be configured to have a plurality of access ports.

Figure 13:
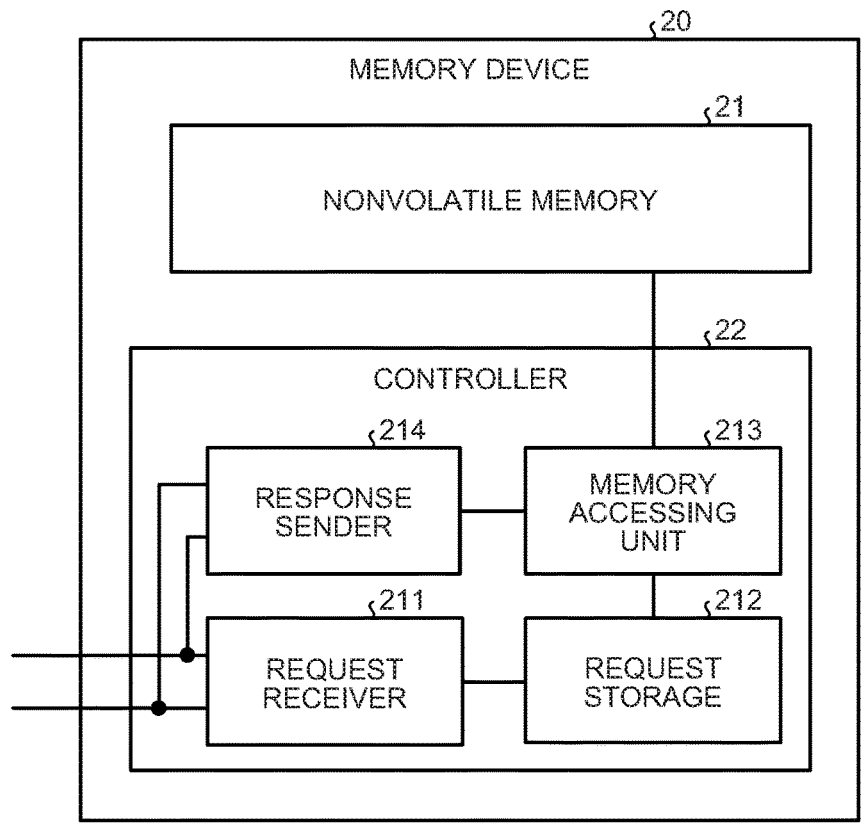
FIG. 13 is a diagram illustrating an exemplary configuration of the memory device according to a modification example.

For example, if the memory device 20 and the processor 10 are connected using a plurality of access ports, it becomes possible to enhance the data transmission capability. For example, as illustrated in FIG. 13, the configuration can be such that the controller 22 has two access ports for receiving requests and sending responses. In this way, as a result of connecting the memory device 20 and the processor 10 using two access ports, it becomes possible to double the bandwidth for the data transfer. Moreover, in the example illustrated in FIG. 13, at the time of storing a received request in the request storage 212, the request receiver 211 associates information indicating the port from which the request was sent. At the time of instructing the response sender 214 to send a response, the request receiver 211 notifies the response sender 214 about the access port from which the request to be responded to was received. Accordingly, the response sender 214 can send back a response with respect to the source of the request.

Figure 14:
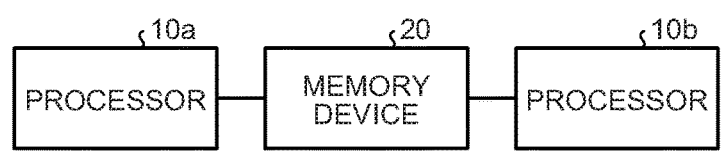
FIG. 14 is a diagram illustrating an example of connection between the memory device and processors according to a modification example.

Meanwhile, for example, the memory device 20 can be connected to a plurality of processors 10. For example, as illustrated in FIG. 14, two processors 10a and 10b can be connected to the memory device 20 that has two access ports. In this example, the processors 10a and 10b can share the data.

Figure 15:
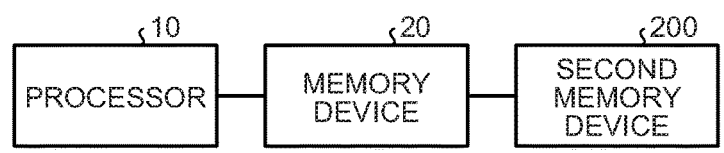
FIG. 15 is a diagram illustrating an example of connection between memory devices and a processor according to a modification example.

Moreover, for example, the configuration can be such that the memory device 20 is connected with the processor 10 as well as with another memory device (hereinafter, referred to as a "second memory device 200"), and a write request issued by the processor 10 is transferred to the second memory device 200 as may be necessary. As illustrated in FIG. 15, the configuration can be such that the memory device 20 is connected with the second memory device 200 and, when a write request for writing data in the second memory device 200 is received from the memory controller 13, the controller 22 of the memory device 20 transfers the write request to the second memory device 200. As a result of such a connection, for example, even if the processor 10 has only a single port for establishing connection with a memory device, it becomes possible to establish connection with a plurality of memory devices.

Figure 16:
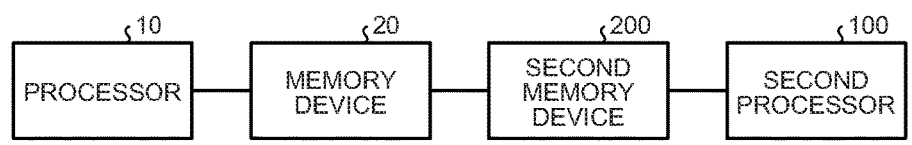
FIG. 16 is a diagram illustrating an example of connection between memory devices and processors according to a modification example.

Alternatively, for example, as illustrated in FIG. 16, the configuration can be such that the second memory device 200 is connected with a second processor 100 that is different than the processor 10.

Figure 17:
FIG. 17 is a diagram illustrating an exemplary format of a request according to a modification example.

As illustrated in FIG. 15 or FIG. 16, when the processor serving as the host device (i.e., the processor 10 or the second processor 100) accesses, via a memory device (one of the memory device 20 and the second memory device 200, hereinafter referred to as a "first memory device"), another memory device (the other of the memory device 20 and the second memory device 200, hereinafter referred to as a "second memory device"); it needs to be determined whether a request issued by the processor to the first memory device is to be processed in the first memory device or to be transferred to the second memory device. That determination can be done using, for example, the upper bits of the address information in the request. Alternatively, as illustrated in FIG. 17, as another method, a request has a "device ID" field that enables identification of the target memory device, a field is set and the first memory device that receives the request can determine according to the device ID about whether to process the request in the first memory device or to transfer the request to another memory device (the second memory device).

Figure 18:
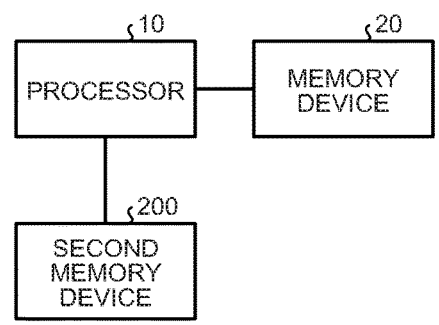
FIG. 18 is a diagram illustrating an example of connection between memory devices and a processor according to a modification example.

Alternatively, for example, as illustrated in FIG. 18, when the processor 10 has a plurality of ports (in the example illustrated in FIG. 18, two ports) for establishing connection with memory devices, it is possible to connect a plurality of memory devices (in the example illustrated in FIG. 18, the memory device 20 and the second memory device 200) directly to the processor 10.

Second Modification Example of First Embodiment

Figure 19:
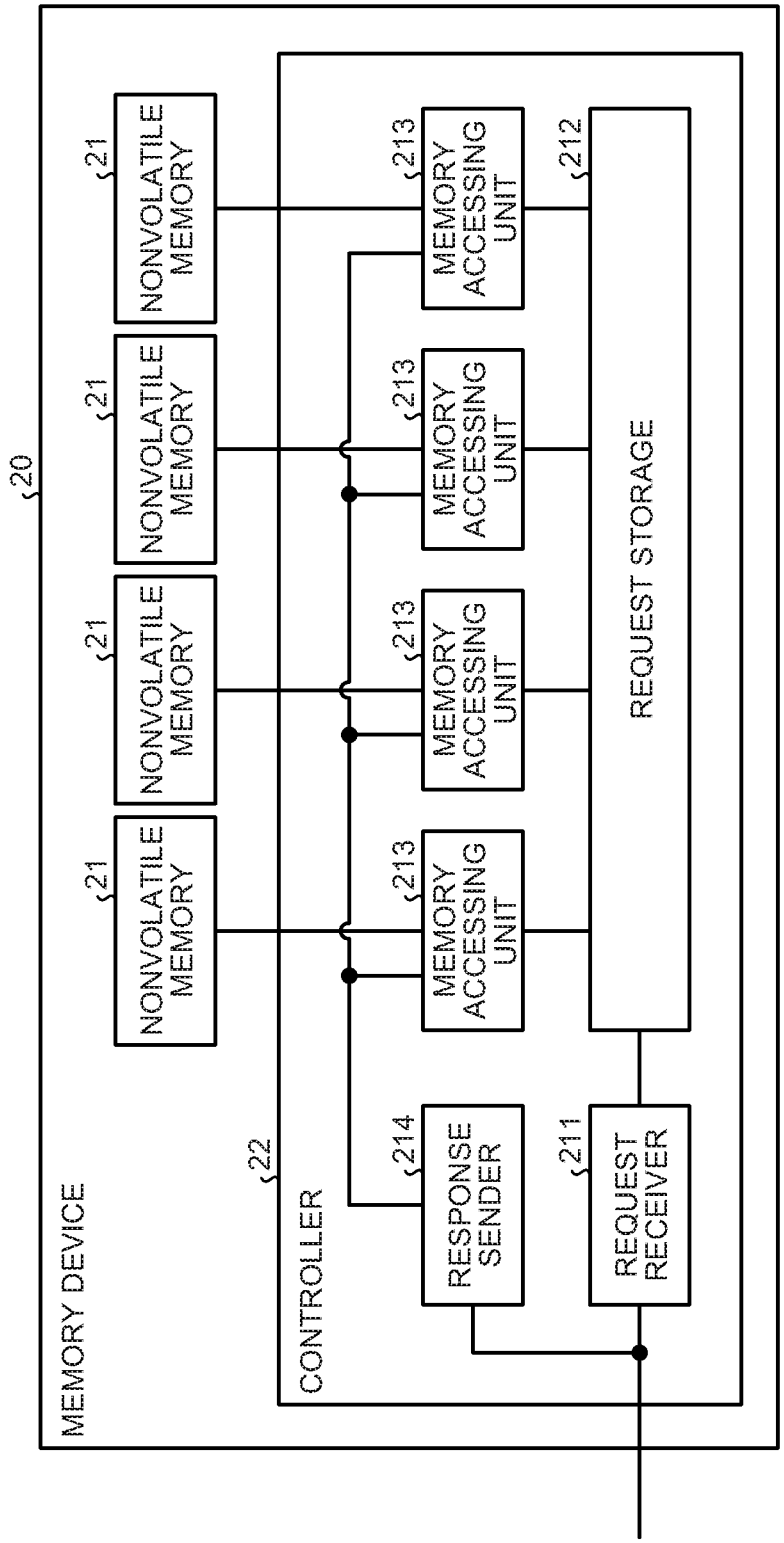
FIG. 19 is a diagram illustrating an exemplary configuration of the memory device according to a modification example.

For example, as in the case of HMC, there is a configuration in which dies or chips of a plurality of nonvolatile memories 21 are installed in the memory device 20. Hence, as illustrated in FIG. 19, the memory device 20 can be configured to include a plurality of nonvolatile memories 21. In the example illustrated in FIG. 19, aside than the fact that a plurality of nonvolatile memories 21 is installed and that a plurality of memory accessing unit 213 is installed on a one-to-one basis with the nonvolatile memories 21, the configuration is identical to the first embodiment.

Each of a plurality of memory accessing units 213 performs data writing or data reading based on a write request or a read request issued with respect to the nonvolatile memory 21 connected to the memory accessing unit 213. Since the nonvolatile memories 21 have mutually different addresses assigned thereto, each memory accessing unit 213 can refer to the address information specified in the request stored in the request storage 212 (or refers to the information corresponding to the request), and can determine whether or not the request is issued with respect to the nonvolatile memory 21 corresponding to (connected to) the memory accessing unit 213.

Figure 20:
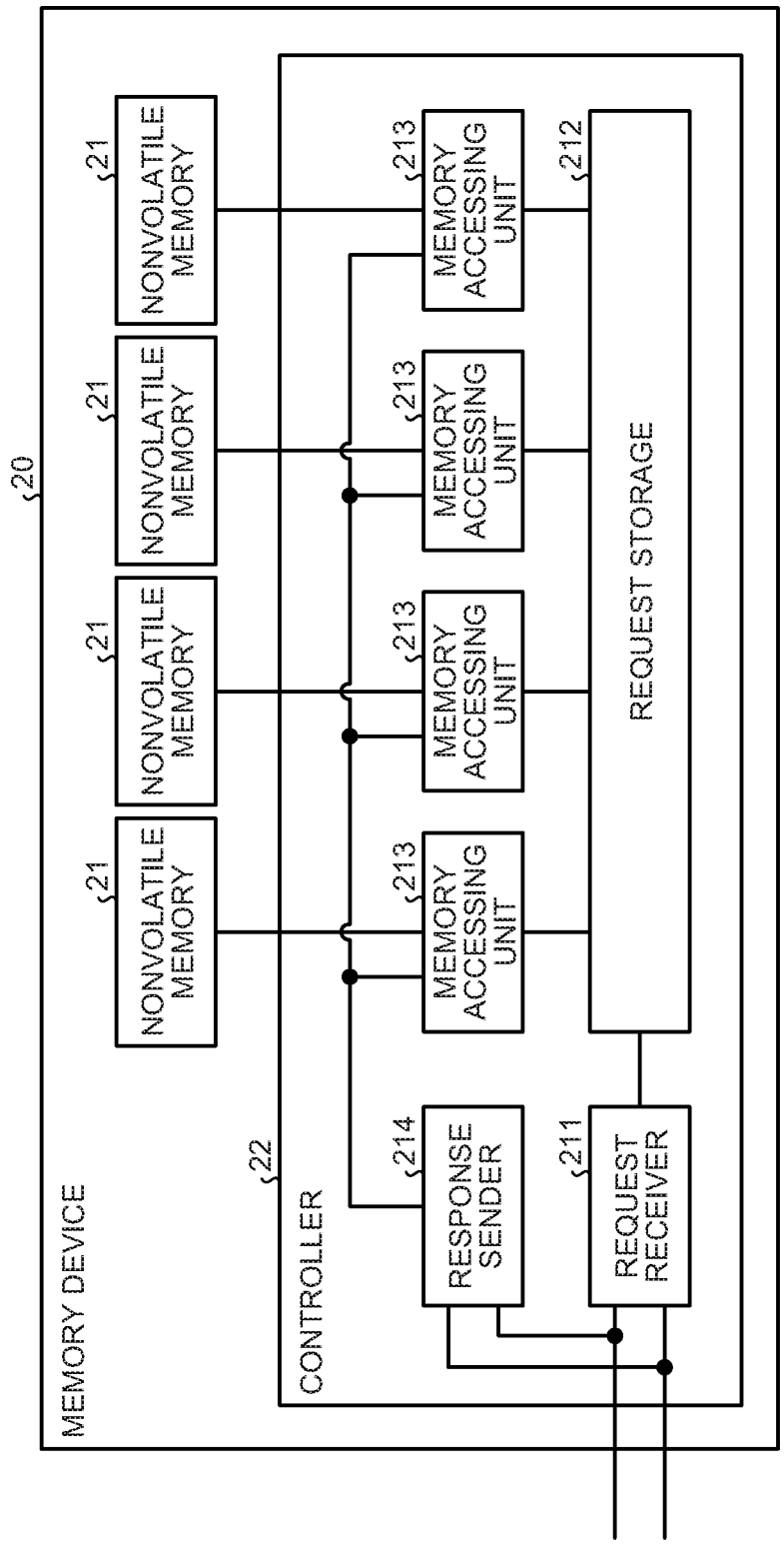
FIG. 20 is a diagram illustrating an exemplary configuration of the memory device according to a modification example.

In FIG. 20 is illustrated a configuration which is a modification example of FIG. 19 and in which the controller 22 has two access points for receiving and sending requests. However, that is not the only possible case, and the number of access ports in the controller 22 can be changed in an arbitrary manner.

Second Embodiment

Given below is the explanation of a second embodiment. Herein, regarding the common portion with the first embodiment, the explanation is not repeated. In the second embodiment, the information processing device 1 has an identical hardware configuration to the first embodiment. Hence, the detailed explanation is not repeated. As compared to the first embodiment, the second embodiment differs in the way that the write requests issued by the processor 10 include a write request doubling up as a writing order confirmation request.

In the second embodiment, a write request is either a non-posted write request, which requires a response with respect to that write request to be sent to the processor 10 after data writing based on the write request is completed, or a posted write request, which does not require a response with respect to the write request to be sent to the processor 10 after data writing based on the write request is completed.

FIG. 21 is a diagram illustrating an exemplary non-posted write request. In FIG. 21, information enabling identification of the fact that the request is a non-posted write request for writing 64-byte data (in the example illustrated in FIG. 21, a "64-BYTE WRITE REQUEST") is specified as the command information. Moreover, the number "4" is specified as the tag information; "108A0" is specified as the address information; and "8F, 42, 0B, 9D" is specified as the target 64-byte data for writing. Thus, the write request illustrated in FIG. 21 can be considered to be a non-posted write request for writing 64-byte data "8F, 42, . . . , 0B, 9D" at the position indicated by the address information "108A0" in the nonvolatile memory 21 of the memory device 20, and a response is required after the data writing is completed.

FIG. 22 is a diagram illustrating an exemplary response with respect to the non-posted write request illustrated in FIG. 21. In the example illustrated in FIG. 22, information enabling identification of the fact that the response is given to the non-posted write information (in the example illustrated in FIG. 22, "WRITE RESPONSE") is specified as the command information. Moreover, in the example illustrated in FIG. 22, information identical to the tag information included in the non-posted write request illustrated in FIG. 21 (i.e., the number "4") is specified as the tag information. Furthermore, in the example illustrated in FIG. 22, the address information is absent.

In the second embodiment, the controller 22 receives a non-posted write request from the processor 10 and performs data writing based on the non-posted write request after the data writing based on the posted write requests received before receiving the non-posted write request is completed; and then sends to the host device a response with respect to the non-posted write request.

Thus, a non-posted write request can be used as a writing order confirmation request (an ordering request). For example, the configuration can be such that, of one or more write requests included in the first writing set that is considered for data writing earlier than the second writing set representing a set of one or more write requests, the last write request sent to the memory device 20 is a non-posted write request and the remaining requests are posted write requests.

Alternatively, for example, the configuration can be such that one or more write requests included in the first writing set, which represents a set of one or more write requests, are posted write requests; and, of one or more write requests included in the second writing set which is considered for data writing after completion of the data writing based on the first writing set, the initial write request sent to the memory device 20 is a non-posted write request and the remaining write requests are posted write requests.

Figure 23:
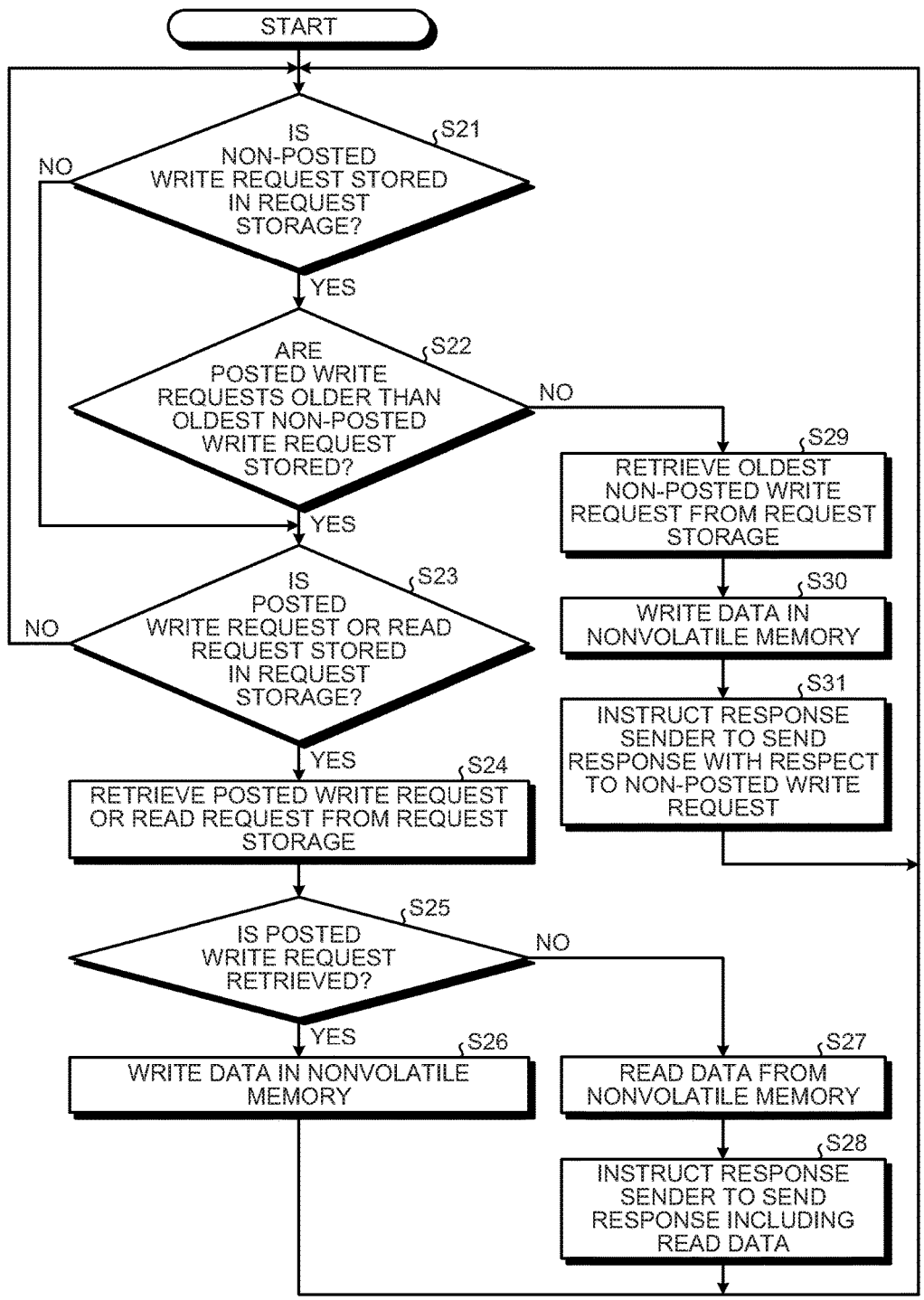
FIG. 23 is a flowchart for explaining an example of the operations performed by the memory accessing unit according to the second embodiment.

FIG. 23 is a flowchart for explaining an example of the operations performed by the memory accessing unit 213 according to the second embodiment. Firstly, the memory accessing unit 213 confirms whether or not a non-posted write request is stored in the request storage 212 (Step S21). If a non-posted write request is stored in the request storage 212 (Yes at Step S21), then the memory accessing unit 213 confirms whether or not any posted write request older than the oldest of the non-posted write requests is stored (Step S22). If any posted write request older than the oldest of the non-posted write requests is stored (Yes at Step S22) or if a non-posted write request is not stored in the request storage 212 (No at Step S21), then the system control proceeds to Step S23.

Then, the memory accessing unit 213 confirms whether or not a posted write request or a read request is stored in the request storage 212 (Step S23). If neither a posted write request nor a read request is stored in the request storage 212 (No at Step S23), then the system control returns to Step S21. On the other hand, if a posted write request or a read request is stored in the request storage 212 (Yes at Step S23), then the memory accessing unit 213 retrieves the posted write request or the read request from the request storage 212 (Step S24). Herein, retrieval of a posted write request or a read request at Step S24 can be done according to an arbitrary method. The simplest method is to retrieve the oldest request from among the posted write requests or the read requests stored in the request storage 212. Another method can be to sequentially retrieve the posted write requests or the read requests issued with respect to, for example, the same row page. Still another method can be to sequentially retrieve the posted write requests or the read requests issued with respect to the same row page with priority given to the requests that have not been retrieved from the request storage 212 over a certain period of time. Other than these methods, it is also possible to implement various other methods.

If the request retrieved at Step S24 is a posted write request (Yes at Step S25), then the memory accessing unit 213 performs data writing based on the retrieved posted write request (Step S26), and the system control returns to Step S21. However, if the request received at Step S24 is a read request (No at Step S25), then the memory accessing unit 213 performs data reading based on the retrieved read request (Step S27) and instructs the response sender 214 to send a response including the read data (i.e., a response with respect to the read request) (Step S28). Upon receiving the instruction, the response sender 214 sends to the processor 10 a response with respect to the read request retrieved at Step S24. Then, the system control returns to Step S21.

Meanwhile, if posted write request older than the oldest of the non-posted write requests is stored (No at Step S22), then the memory accessing unit 213 retrieves the oldest of the non-posted write requests from the request storage 212 (Step S29) and performs data writing based on that non-posted write request (Step S30). Then, the memory accessing unit 213 instructs the response sender 214 to send a response with respect to the non-posted write request (Step S31). Upon receiving the instruction, the response sender 214 sends to the processor 10 a response with respect to the non-posted write request. Then, the system control returns to Step S21.

In the example illustrated in FIG. 23, a method of implementation is illustrated in which the target data for writing, which is specified in a non-posted write request doubling up as a writing order confirmation request (an ordering request), is written to be persistent in the memory cells of the nonvolatile memory 21, and then a response with respect to the non-posted write request is sent back. As a modification example of that method of implementation, after the start of data writing based on a non-posted write request doubling up as a writing order confirmation request (an ordering request), a response with respect to the non-posted write request can be sent back before the target data for writing is written to be persistent in the memory cells of the nonvolatile memory 21.

Third Embodiment

Given below is the explanation of a third embodiment. Herein, regarding the common portion with the first and second embodiments, the explanation is not repeated. In the third embodiment, the information processing device 1 has an identical hardware configuration to the first embodiment. Hence, the detailed explanation is not repeated. In an identical manner to the second embodiment, the third embodiment also differs from the first embodiment in the way that the write requests issued by the processor 10 include a write request doubling up as a writing order confirmation request. Besides, as compared to the second embodiment, the third embodiment differs in a way that, in order to enable writing based on the write request doubling up as a writing order confirmation request at an arbitrary point of time before the point of time of writing order confirmation, the write request doubling up as a writing order confirmation request is managed in the request storage 212 in association with flag information indicating whether or not data writing is performed.

In the third embodiment, a write request is either a non-posted write request, which requires a response with respect to the write request to be sent to the processor 10 after data writing based on the write request is completed, or a posted write request, which does not require a response with respect to the write request to be sent to the processor 10 after data writing based on the write request is completed. When a non-posted write request is received from the processor 10, the controller 22 performs both of data writing based on the posted write requests received before receiving the non-posted write request and data writing based on the non-posted write request; and then sends to the processor 10 a response with respect to the non-posted write request. In the third embodiment, the controller 22 retrieves a non-posted write request that is stored in the request storage 212 in association with the flag information set to indicate that data writing is not performed; performs data writing based on the retrieved non-posted write request; associates the non-posted write request with flag information set to indicate that data writing is performed; stores back the non-posted write request at the original position in the request storage 212; performs data writing based on the write requests received before receiving the non-posted write request; and then sends to the host device a response with respect to the non-posted write request.

For example, the configuration can be such that, of one or more write requests included in the first writing set that is considered for data writing earlier than the second writing set representing a set of one or more write requests, the last write request sent to the memory device 20 is a non-posted write request and the remaining requests are posted write requests.

Figure 24:
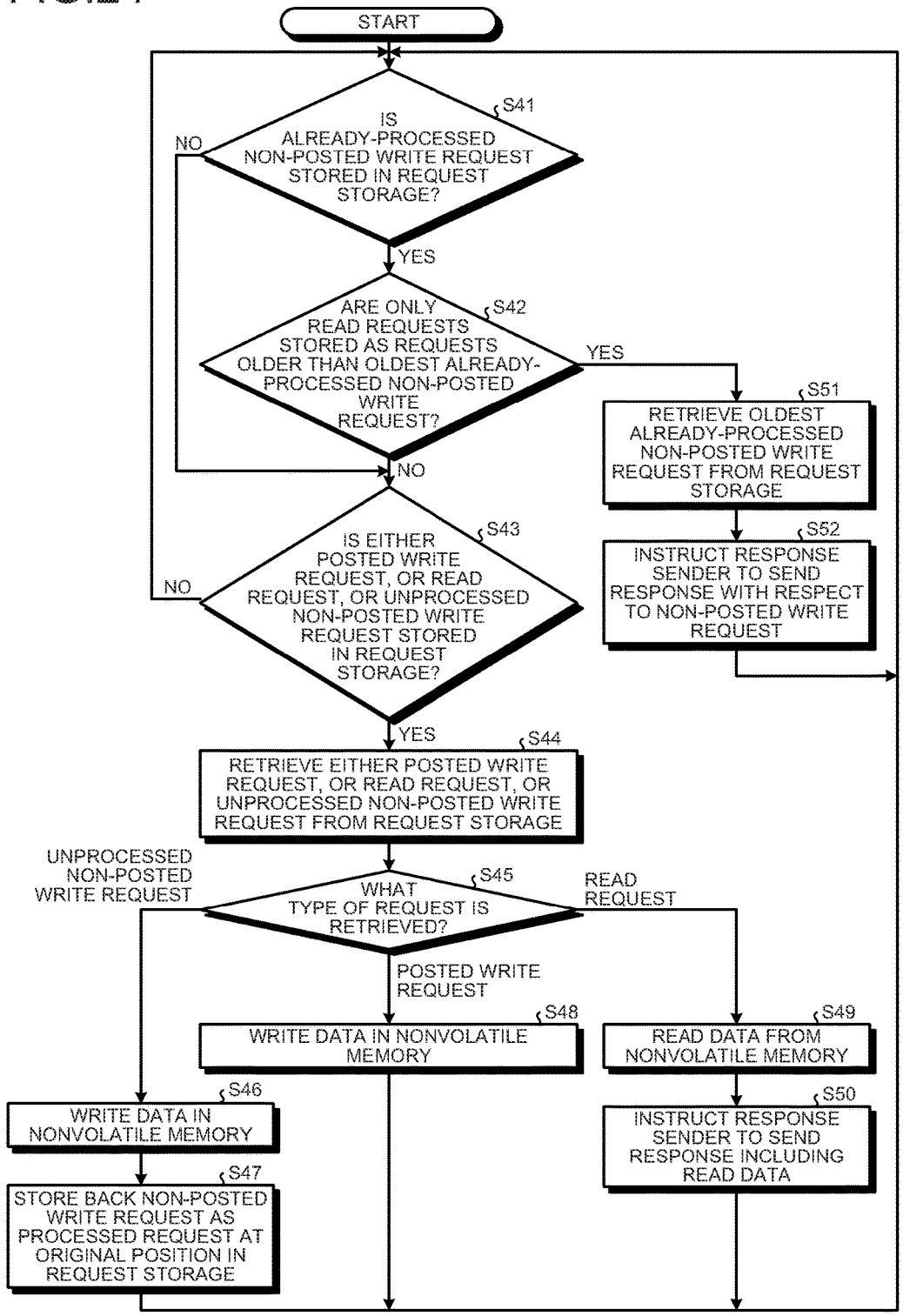
FIG. 24 is a flowchart for explaining an example of the operations performed by the memory accessing unit according to a third embodiment.

FIG. 24 is a flowchart for explaining an example of the operations performed by the memory accessing unit 213 according to the third embodiment. Firstly, the memory accessing unit 213 confirms whether or not an already-processed non-posted write request (i.e., a non-posted write request that is associated with the flag information set to indicate that data writing is performed) is stored in the request storage 212 (Step S41). If an already-processed non-posted write request is stored in the request storage 212 (Yes at Step S41), the memory accessing unit 213 confirms whether or not the requests older than the oldest of the already-processed non-posted write requests are only read requests (Step S42). If the requests older than the oldest of the already-processed non-posted write requests are not only read requests (No at Step S42) or if no already-processed non-posted write request is stored in the request storage 212 (No at Step S41), then the system control proceeds to Step S43.

The memory accessing unit 213 confirms whether or not either a posted write request, or a read request, or an unprocessed non-posted write request (i.e., a non-posted write request that is associated with the flag information set to indicate that data writing is not performed) is stored in the request storage 212 (Step S43). If neither a posted write request, nor a read request, nor an unprocessed non-posted write request is stored in the request storage 212 (No at Step S43), then the system control returns to Step S41. On the other hand, if either a posted write request, or a read request, or an unprocessed non-posted write request is stored in the request storage 212 (Yes at Step S43), then the memory accessing unit 213 retrieves either a posted write request, or a read request, or an unprocessed non-posted write request from the request storage 212 (Step S44). Herein, retrieval of the request at Step S44 can be done according to an arbitrary method. The simplest method is to retrieve the oldest request from among the posted write requests, the read requests, or the unprocessed non-posted write requests stored in the request storage 212. Another method can be to sequentially retrieve the posted write requests, the read requests, or the unprocessed non-posted write requests issued with respect to, for example, the same row page. Still another method can be to sequentially retrieve the posted write requests, the read requests, or the unprocessed non-posted write requests issued with respect to the same row page with priority given to the requests that have not been retrieved from the request storage 212 over a certain period of time. Other than these methods, it is also possible to implement various other methods.

Then, the memory accessing unit 213 determines the type of the request retrieved at Step S44 (Step S45). If the request retrieved at Step S44 is a non-posted write request (an unprocessed non-posted write request), then the memory accessing unit 213 performs data writing based on the non-posted write request (Step S46); and stores back the non-posted write request as an already-processed non-posted write request at the original position in the request storage 212 (Step S47). That is, the memory accessing unit 213 associates the non-posted write request with flag information set to indicate that data writing is performed, and stores back the non-posted write request at the original position in the request storage 212. Then, the system control returns to Step S41.

Meanwhile, if the request retrieved at Step S44 is a posted write request, then the memory accessing unit 213 performs data writing based on that posted write request (Step S48). Then, the system control returns to Step S41.

If the request retrieved at Step S44 is a read request, then the memory accessing unit 213 performs data reading based on the read request (Step S49) and instructs the response sender 214 to send a response including the read data (Step S50). Upon receiving the instruction, the response sender 214 sends to the processor 10 a response with respect to the read request retrieved at Step S44. Then, the system control returns to Step S41.

Meanwhile, if the requests older than the oldest of the already-processed non-posted write requests are only read requests (Yes at Step S42), then the memory accessing unit 213 retrieves the oldest of the already-processed non-posted write requests from the request storage 212 (Step S51); and instructs the response sender 214 to send a response with respect to the already-processed non-posted write request that is retrieved (Step S52). Upon receiving the instruction, the response sender 214 sends to the processor 10 a response with respect to the already-processed non-posted write request retrieved at Step S51. Then, the system control returns to Step S41.

Meanwhile, as another modification example of the second and third embodiments, for example, it is possible to have a configuration in which separate flag information is set for specifying whether or not to give an ordering ensuring function (the function of a writing order confirmation request) to a write request; and, according to the flag information included in the write request, the controller 22 switches between performing operations in response to a normal write request and performing operations in response to a write request for ensuring the ordering.

Fourth Embodiment

Given below is the explanation of a fourth embodiment. Herein, regarding the common portion with the first to third embodiments, the explanation is not repeated. In the fourth embodiment, the information processing device 1 has an identical hardware configuration to the first embodiment. Hence, the detailed explanation is not repeated. As compared to the embodiments described above, the fourth embodiment differs in the way that a specific read request for reading data from specific positions (addresses) in the nonvolatile memory 21 also fulfils the role of a writing order confirmation request.

When a special read request is received from the processor 10, the controller 22 performs data writing based on the write requests received before receiving the special read request; performs data reading based on the specific read request; and sends to the processor 10 a response with respect to the specific read request. A specific read request is distinguished from other read requests by checking whether or not specific reading positions (addresses) are specified. As a specific address, it is possible to use a fixed address (such as the 0 address or the FFFFFF address). Alternatively, a specific address register can be installed in the controller 22 for storing specific addresses; and a unit for setting an arbitrary address in the specific address register can be disposed so that, if the address specified in a read request has the same value as the specific address register, it can be determined that a specific read request is issued.

Figure 25:
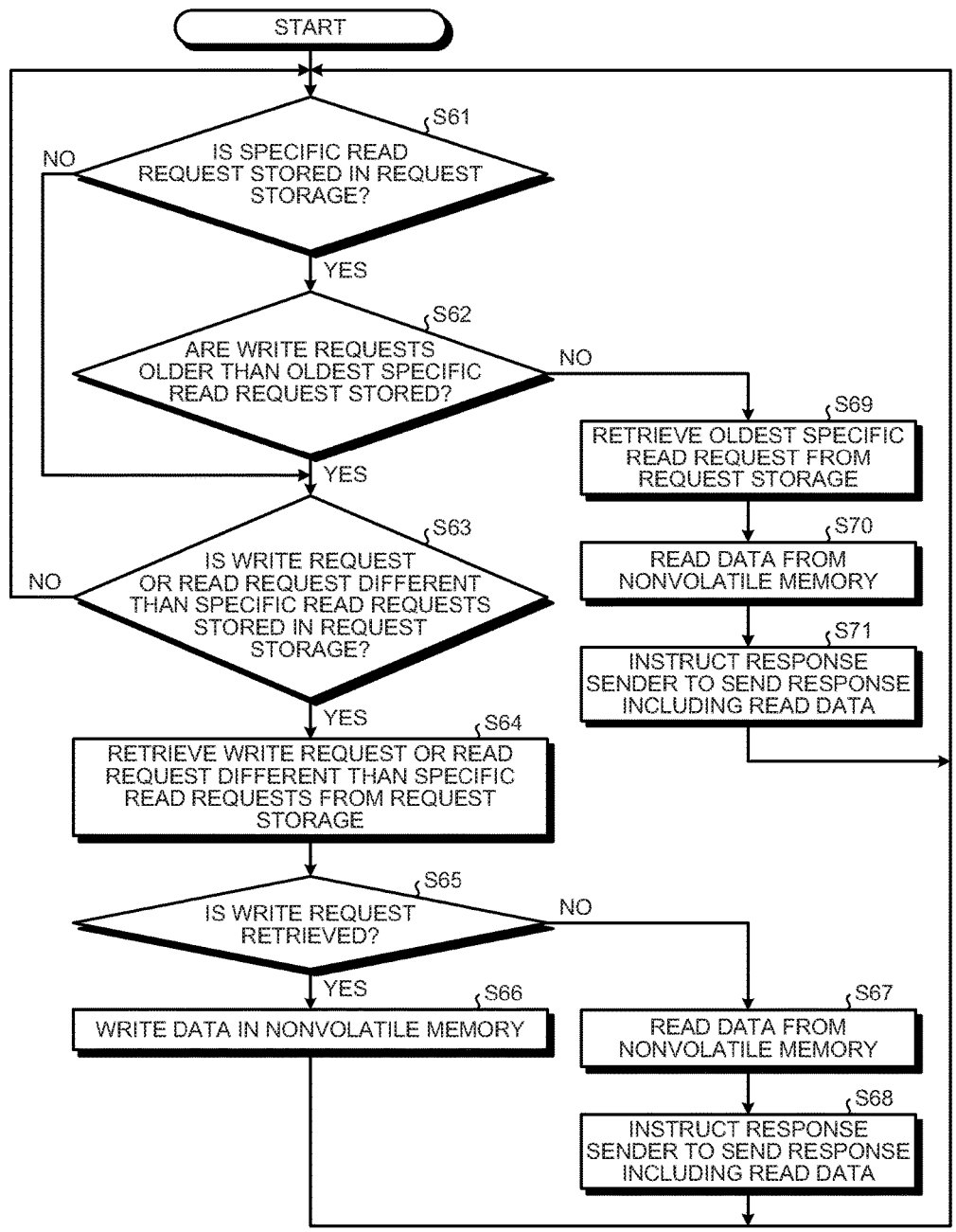
FIG. 25 is a flowchart for explaining an example of the operations performed by the memory accessing unit according to a fourth embodiment.

FIG. 25 is a flowchart for explaining an example of the operations performed by the memory accessing unit 213 according to the fourth embodiment. Firstly, the memory accessing unit 213 confirms whether or not a specific read request is stored in the request storage 212 (Step S61). If a specific read request is stored in the request storage 212 (Yes at Step S61), then the memory accessing unit 213 confirms whether or not write requests older than the oldest of the specific read requests are stored (Step S62). If write requests older than the oldest of the specific read requests are stored (Yes at Step S62) or if no specific read request is stored in the request storage 212 (No at Step S61), then the system control proceeds to Step S63.

Subsequently, the memory accessing unit 213 confirms whether or not a write request or a read request different than a specific read request is stored in the request storage 212 (Step S63). If neither a write request nor a read request different than a specific read request is stored in the request storage 212 (No at Step S63), then the system control returns to Step S61. On the other hand, if a write request or a read request different than a specific read request is stored in the request storage 212 (Yes at Step S63), then the memory accessing unit 213 retrieves the write request or the read request different than a specific read request from the request storage 212 (Step S64). Herein, retrieval of the write request or the read request at Step S64 can be done according to an arbitrary method. The simplest method is to retrieve the oldest request from among the write requests and the read requests stored in the request storage 212. Another method can be to sequentially retrieve the write requests or the read requests issued with respect to, for example, the same row page. Still another method can be to sequentially retrieve the write requests or the read requests issued with respect to the same row page with priority given to the requests that have not been retrieved from the request storage 212 over a certain period of time. Other than these methods, it is also possible to implement various other methods.

If the request retrieved at Step S64 is a write request (Yes at Step S65), then the memory accessing unit 213 performs data writing (in the nonvolatile memory 21) based on the retrieved write request (Step S66); and the system control returns to Step S61. On the other hand, if the request retrieved at Step S64 is a read request (different than a specific read request) (No at Step S65), then the memory accessing unit 213 performs data reading (from the nonvolatile memory 21) based on the retrieved read request (Step S67); and instructs the response sender 214 to send a response including the read data (Step S68). Upon receiving the instruction, the response sender 214 sends to the processor 10 a response with respect to the read request retrieved at Step S64. Then, the system control returns to Step S61.

Meanwhile, if write requests older than the oldest of the specific read requests are not stored (No at Step S62), then the memory accessing unit 213 retrieves the oldest of the specific read requests from the request storage 212 (Step S69); performs data reading (from the nonvolatile memory 21) based on the retrieved specific read request (Step S70); and instructs the response sender 214 to send a response including the read data (a response with respect to the specific read request) (Step S71). Upon receiving the instruction, the response sender 214 sends to the processor 10 a response with respect to the specific read request. Then, the system control returns to Step S61.

Fifth Embodiment

Given below is the explanation of a fifth embodiment. Herein, regarding the common portion with the first to fourth embodiments, the explanation is not repeated. In the fifth embodiment, the information processing device 1 has an identical hardware configuration to the first embodiment. Hence, the detailed explanation is not repeated. As compared to the embodiments described above, the fifth embodiment differs in the way that a specific write request for writing data at specific positions (addresses) in the nonvolatile memory 21 also fulfils the role of a writing order confirmation request. More particularly, a specific write request is a non-posted write request that requires a response with respect to the specific write request to be sent to the processor 10 after data writing based on the specific write request is completed.

When a specific write request is received from the processor 10, the controller 22 performs data writing based on the specific write request after performing data writing based on the write requests received before receiving the specific write request; and sends to the processor 10 a response with respect to the specific write request. A specific write request is distinguished from other write requests by checking whether or not specific writing positions (addresses) are specified. As a specific address, it is possible to use a fixed address (such as the 0 address or the FFFFFF address). Alternatively, a specific address register can be installed in the controller 22 for storing specific addresses; and a unit for setting an arbitrary address in the specific address register can be disposed so that, if the address specified in a write request has the same value as the specific address register, it can be determined that a specific write request is issued.

For example, of one or more write requests included in the first writing set that is considered for data writing earlier than the second writing set representing a set of one or more write requests, the last write request sent to the memory device 20 can be a specific write request and the remaining requests can be non-posted write requests or posted write requests.

Alternatively, for example, of one or more write requests included in the second writing set that is considered for data writing after the first writing set representing a set of one or more write requests, the first write request sent to the memory device 20 can be a specific write request. In that case, only after a response with respect to the specific write request is received, the remaining write requests are issued. Herein, the remaining requests can be non-posted write requests or posted write requests.

Figure 26:
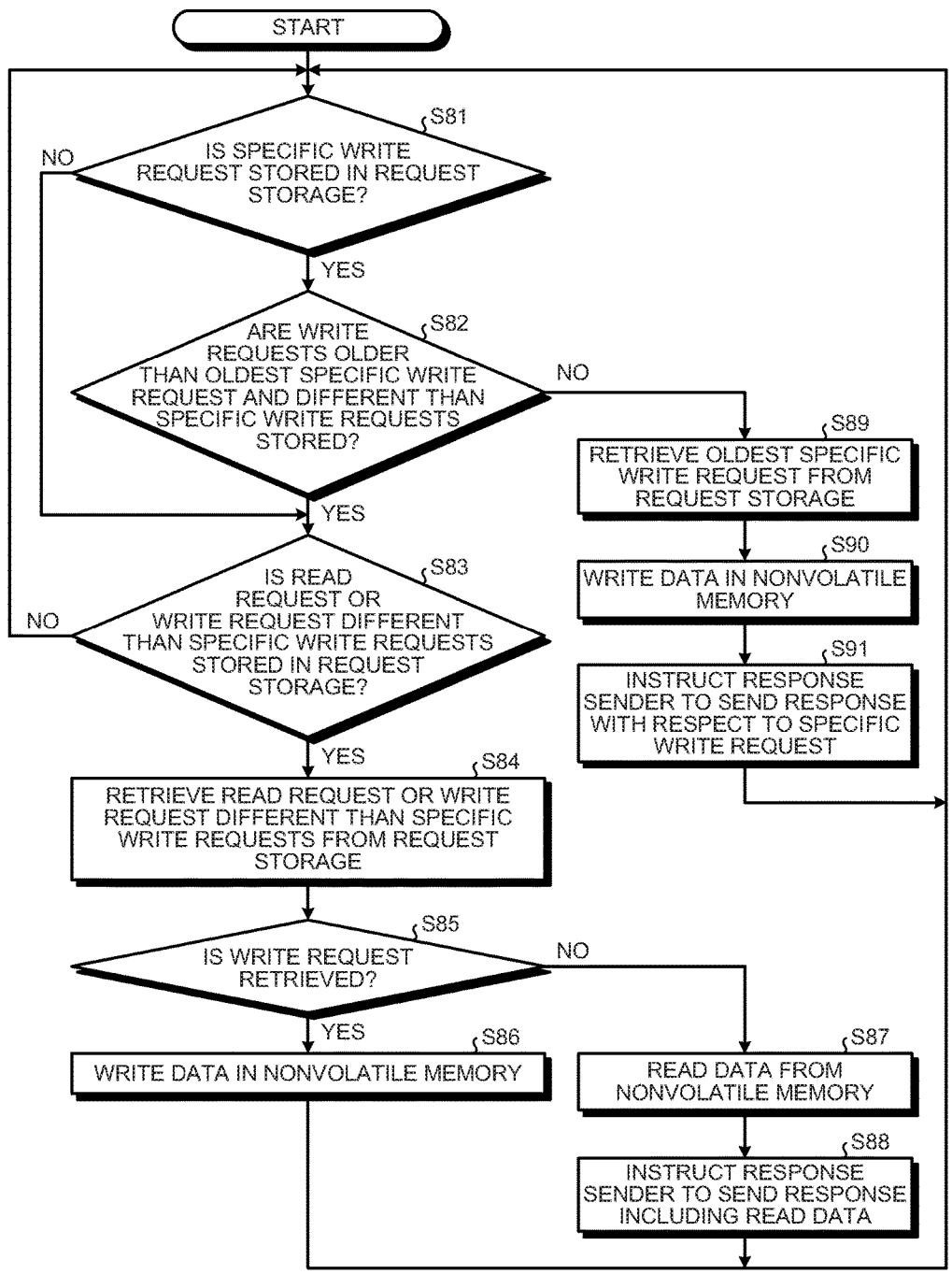
FIG. 26 is a flowchart for explaining an example of the operations performed by the memory accessing unit according to a fifth embodiment.

FIG. 26 is a flowchart for explaining an example of the operations performed by the memory accessing unit 213 according to the fifth embodiment. Firstly, the memory accessing unit 213 confirms whether or not a specific write request is stored in the request storage 212 (Step S81). If a specific write request is stored in the request storage 212 (Yes at Step S81), then the memory accessing unit 213 confirms whether or not write requests (non-posted write requests or posted write requests), which are older than the oldest of the specific write requests and different than the specific write requests, are stored (Step S82). If write requests older than the oldest of the specific write requests are stored (Yes at Step S82) or if no specific write request is stored in the request storage 212 (No at Step S81), then the system control proceeds to Step S83.

Then, the memory accessing unit 213 confirms whether or not a write request different than a specific write request or a read request is stored in the request storage 212 (Step S83). If neither a write request different than a specific write request nor a read request is stored in the request storage 212 (No at Step S83), then the system control returns to Step S81. On the other hand, if a write request different than a specific write request or a read request is stored in the request storage 212 (Yes at Step S83), then the memory accessing unit 213 retrieves the write request different than a specific write request or the read request from the request storage 212 (Step S84). Herein, retrieval of the write request or the read request at Step S84 can be done according to an arbitrary method. The simplest method is to retrieve the oldest request from among the write requests, which are different than the specific write requests, and the read requests stored in the request storage 212. Another method can be to sequentially retrieve the write requests, which are different than the specific write requests, or the read requests issued with respect to, for example, the same row page. Still another method can be to sequentially retrieve the write requests, which are different than the specific write requests, or the read requests issued with respect to the same row page with priority given to the requests that have not been retrieved from the request storage 212 over a certain period of time. Other than these methods, it is also possible to implement various other methods.

If the request retrieved at Step S84 is a write request (different than a specific write request) (Yes at Step S85), then the memory accessing unit 213 performs data writing based on the retrieved write request (Step S86); and the system control returns to Step S81. On the other hand, if the request retrieved at Step S84 is a read request (No at Step S85), then the memory accessing unit 213 performs data reading based on the retrieved read request (Step S87); and instructs the response sender 214 to send a response including the read data (a response with respect to the read request) (Step S88). Upon receiving the instruction, the response sender 214 sends to the processor 10 a response with respect to the read request retrieved at Step S84. Then, the system control returns to Step S81.

Meanwhile, if write requests older than the oldest of the specific write requests are not stored (No at Step S82), then the memory accessing unit 213 retrieves the oldest of the specific write requests from the request storage 212 (Step S89) and performs data writing based on the retrieved specific data write request (Step S90). Then, the memory accessing unit 213 instructs the response sender 214 to send a response with respect to the specific write request (Step S91). Upon receiving the instruction, the response sender 214 sends to the processor 10 a response with respect to the specific write request. Then, the system control returns to Step S81.

Sixth Embodiment

Given below is the explanation of a sixth embodiment. Herein, regarding the common portion with the first to fifth embodiments, the explanation is not repeated. In the sixth embodiment, the information processing device 1 has an identical hardware configuration to the first embodiment. Hence, the detailed explanation is not repeated. In an identical manner to the fifth embodiment, the sixth embodiment also differs from the embodiments described above in the way that a specific write request for writing data at specific positions (addresses) in the nonvolatile memory 21 also fulfils the role of a writing order confirmation request. Besides, as compared to the fifth embodiment, the sixth embodiment differs in a way that, in order to enable writing based on the specific write request at an arbitrary point of time before the point of time of writing order confirmation, the specific write request is managed in the request storage 212 in association with flag information indicating whether or not data writing is performed.

In the sixth embodiment, a specific write request, which is issued for writing data at specific positions in the nonvolatile memory 21, requires a response with respect to the specific write request to be sent to the processor 10 after data writing based on the specific write request is completed. Thus, the specific write request can be considered as one form of a non-posted write request. When a specific write request is received from the processor 10, the controller 22 performs both of data writing based on the write requests received before receiving the specific write request and data writing based on the specific write request; and then sends to the processor 10 a response with respect to the specific write request. In the sixth embodiment, the controller 22 retrieves a specific write request that is stored in the request storage 212 in association with the flag information set to indicate that data writing is not performed; performs data writing based on the retrieved specific write request; associates the specific write request with flag information set to indicate that data writing is performed; stores back the specific write request at the original position in the request storage 212; performs data writing based on the write requests received before receiving the specific write request; and then sends to the processor 10 a response with respect to the specific write request.

For example, the configuration can be such that, of one or more write requests included in the first writing set that is considered for data writing earlier than the second writing set representing a set of one or more write requests, the last write request sent to the memory device 20 is a specific write request. Then, a response with respect to the specific write request is awaited before issuing the write requests included in the second writing set.

Figure 27:
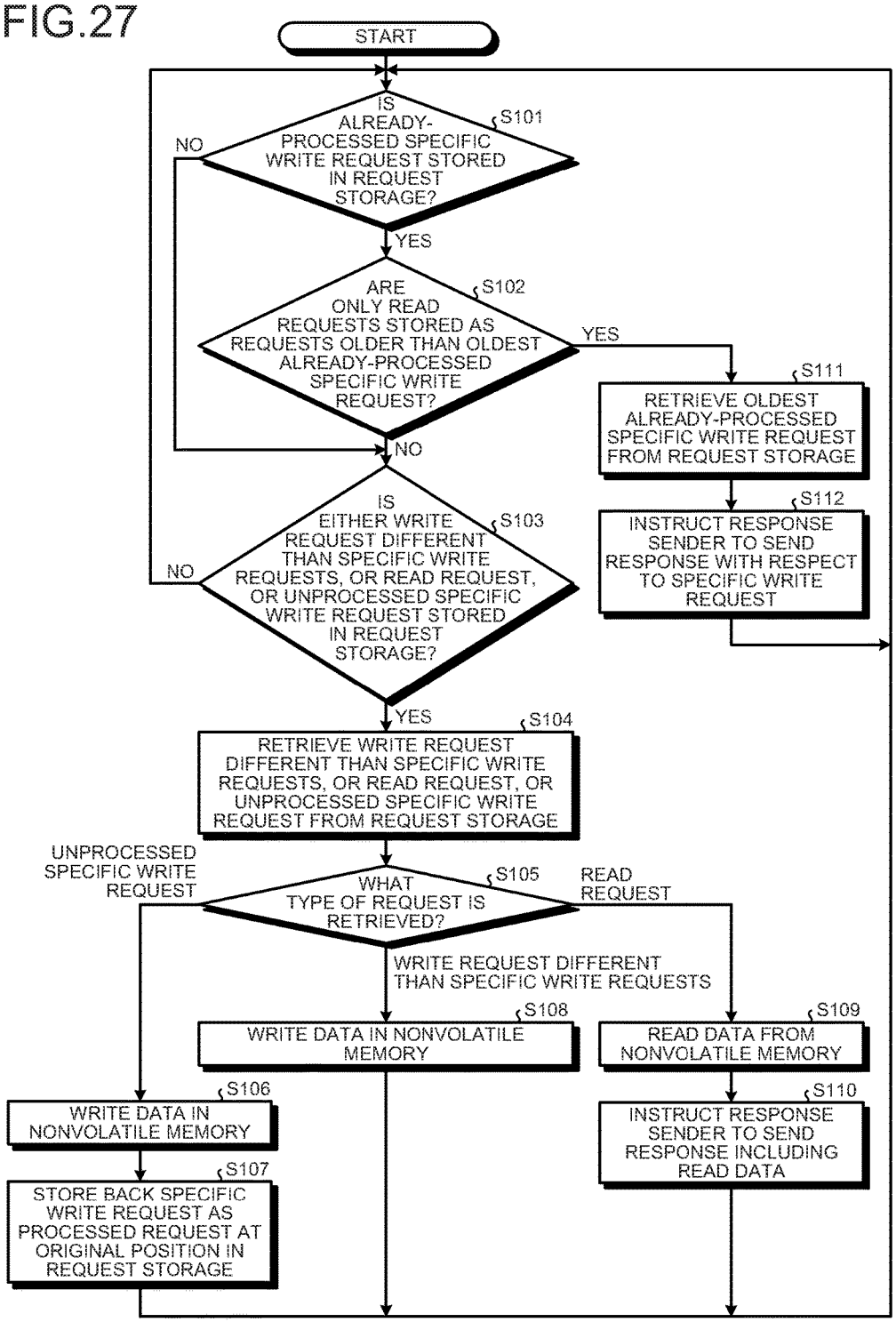
FIG. 27 is a flowchart for explaining an example of the operations performed by the memory accessing unit according to a sixth embodiment.

FIG. 27 is a flowchart for explaining an example of the operations performed by the memory accessing unit 213 according to the sixth embodiment. Firstly, the memory accessing unit 213 confirms whether or not an already-processed specific write request (i.e., a specific write request including the flag information indicating that data writing is performed) is stored in the request storage 212 (Step S101). If an already-processed specific write request is stored in the request storage 212 (Yes at Step S101), then the memory accessing unit 213 confirms whether or not the requests older than the oldest of the already-processed specific write requests are only read requests (Step S102). If the requests older than the oldest of the already-processed specific write requests are not only read requests (No at Step S102) or if no already-processed specific write request is stored in the request storage 212 (No at Step S101), then the system control proceeds to Step S103.

The memory accessing unit 213 confirms whether or not either a write request other than a specific write request (can be a non-posted write request or a posted write request), or a read request, or an unprocessed specific write request (i.e., a specific write request including the flag information indicating that data writing is not performed) is stored in the request storage 212 (Step S103). If neither a write request other than a specific write request, nor a read request, nor an unprocessed specific write request is stored in the request storage 212 (No at Step S103), then the system control returns to Step S101. If either a write request other than a specific write request, or a read request, or an unprocessed specific write request is stored in the request storage 212 (Yes at Step S103), then the memory accessing unit 213 retrieves either a write request other than a specific write request, or a read request, or an unprocessed specific write request from the request storage 212 (Step S104). Herein, retrieval of the request at Step S104 can be done according to an arbitrary method. The simplest method is to retrieve the oldest request from among the write requests other than a specific write request, read requests, or unprocessed specific write requests stored in the request storage 212. Another method can be to sequentially retrieve either the unprocessed specific write requests, or the write requests other than the specific write requests, or the read requests issued with respect to, for example, the same row page. Still another method can be to sequentially retrieve either the unprocessed specific write requests, or the write requests other than the specific write requests, or the read requests issued with respect to the same row page with priority given to the requests that have not been retrieved from the request storage 212 over a certain period of time. Other than these methods, it is also possible to implement various other methods.

Then, the memory accessing unit 213 determines the type of the request retrieved at Step S104 (Step S105). If the request retrieved at Step S104 is a specific write request (an unprocessed specific write request), then the memory accessing unit 213 performs data writing based on the specific write request (Step S106); and stores back the specific write request as an already-processed specific write request at the original position in the request storage 212 (Step S107). That is, the memory accessing unit 213 sets flag information, which is included in the specific write request, to indicate that data writing is performed; and then stores back the specific write request at the original position in the request storage 212. Then, the system control returns to Step S101.

Meanwhile, if the request retrieved at Step S104 is a write request other than a specific write request, then the memory accessing unit 213 performs data writing based on that write request (Step S108). Then, the system control returns to Step S101.

If the request retrieved at Step S104 is a read request, then the memory accessing unit 213 performs data reading based on the read request (Step S109) and instructs the response sender 214 to send a response including the read data (Step S110). Upon receiving the instruction, the response sender 214 sends to the processor 10 a response with respect to the read request retrieved at Step S104. Then, the system control returns to Step S101.

Meanwhile, if the requests older than the oldest of the already-processed specific write requests are only read requests (Yes at Step S102), then the memory accessing unit 213 retrieves the oldest of the already-processed specific write requests from the request storage 212 (Step S111), and instructs the response sender 214 to send a response with respect to the already-processed specific write request that is retrieved (Step S112). Upon receiving the instruction, the response sender 214 sends to the processor 10 a response with respect to the already-processed specific write request retrieved at Step S111. Then, the system control returns to Step S101.

Seventh Embodiment

Given below is the explanation of a seventh embodiment. Herein, regarding the common portion with the first to sixth embodiments, the explanation is not repeated. As compared to the embodiments described above, the seventh embodiment differs in the way that the nonvolatile memory 21 is made of a plurality of areas (in the following explanation, sometimes called "blocks") and a configuration is adopted for ensuring that the writing order (i.e., ordering) among the writing sets is followed in each block.

For example, in the memory device 20 in which a plurality of nonvolatile memories 21 is embedded, the nonvolatile memories 21 can be treated as blocks. Alternatively, for example, in the memory device in which the nonvolatile memory 21 having a plurality of banks is embedded, the banks can be treated as blocks. Still alternatively, all nonvolatile memories 21 in the memory device 20 can be divided into blocks of a predetermined size. Still alternatively, the controller 22 can hold block management information (in, for example, a table form) for managing the blocks; divide the nonvolatile memory 21 into blocks of an arbitrary size; record the start address and the end address of each block in the block management information; and determine the block to which a request received from the processor 10 belongs (corresponds) by referring to the block management information.

Figure 28:
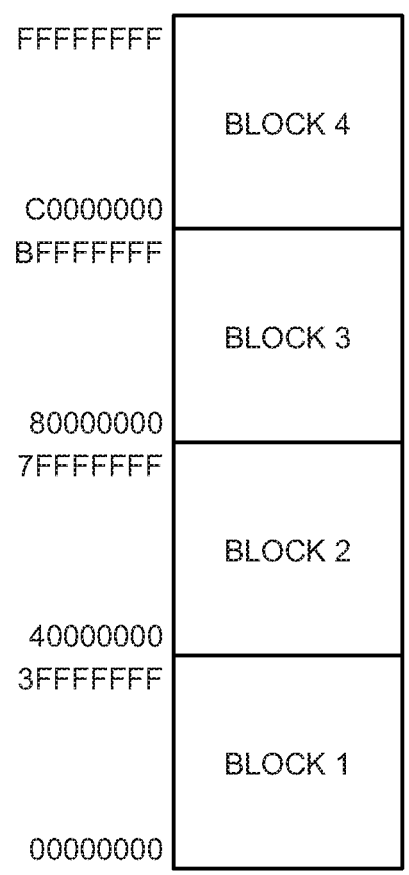
FIG. 28 is a diagram illustrating an example of blocks according to a seventh embodiment.
Figure 29:
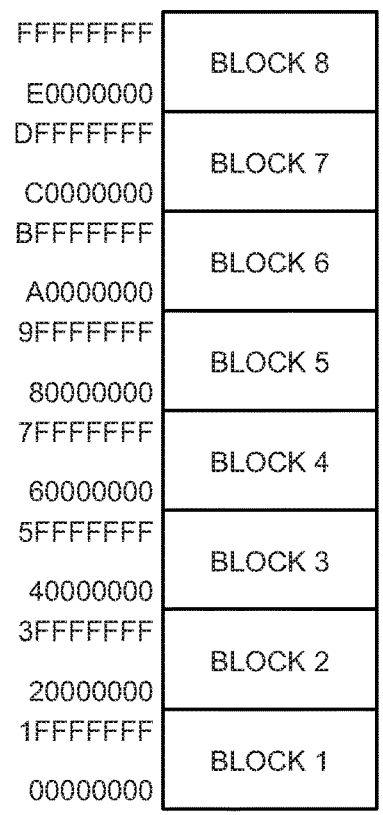
FIG. 29 is a diagram illustrating an example of blocks according to a seventh embodiment.

In FIG. 28 is illustrated an example in which the nonvolatile memory 21 of four gigabytes is divided into four blocks. In FIG. 29 is illustrated an example in which the nonvolatile memory 21 of four gigabytes is divided into eight blocks.

Figure 30:
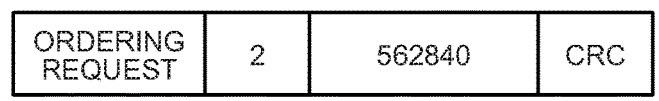
FIG. 30 is a diagram illustrating an example of a writing order confirmation request according to the seventh embodiment.
Figure 31:
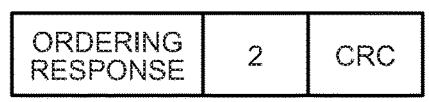
FIG. 31 is a diagram illustrating an exemplary response given with respect to a writing order confirmation request according to the seventh embodiment.

FIG. 30 is a diagram illustrating an example of a writing order confirmation request (an ordering request) according to the seventh embodiment. As compared to the writing order confirmation request illustrated in FIG. 7, the writing order confirmation request illustrated in FIG. 30 differs in the way of holding address information. In the example illustrated in FIG. 30, in the writing order confirmation request, information enabling identification of the fact that the request is a writing order confirmation request (in the example illustrated in FIG. 30, "ORDERING REQUEST") is specified as the command information. Moreover, in the example illustrated in FIG. 30, the number "2" is specified as the tag information, while "562840" is specified as the address information. Thus, the writing order confirmation request illustrated in FIG. 30 can be considered to be information for requesting confirmation of the fact that, in order to ensure that the writing order is followed in the block to which the address information "562840" in the nonvolatile memory 21 belongs, data writing has been performed based on one or more already-sent write requests corresponding to the block. FIG. 31 is a diagram illustrating a response with respect to the writing order confirmation request illustrated in FIG. 30. The response illustrated in FIG. 31 has an identical format to the response illustrated in FIG. 8.

For example, in the configuration in which the memory device 20 according to the seventh embodiment includes a single request storage 212 and a single memory accessing unit 213 as illustrated in FIG. 10, the memory accessing unit 213 holds information indicating the correspondence between the address information and the blocks (i.e., holds the block management information); refers to the address information included in the requests that are stored in the request storage 212; and determines the blocks for which the requests are intended (determines the blocks corresponding to the requests). That is, the memory accessing unit 213 classifies a plurality of requests, which is stored in the request storage 212, on a block-by-block basis based on the address information included in the requests. Then, for each block, the memory accessing unit 213 treats all requests belonging to that block as the processing targets and processes those requests according to the sequence of operations illustrated in FIG. 12 (in this example, the sequence of operations identical to the first embodiment). At that time, particular blocks may be processed with priority, or all blocks may be processed impartially.

Figure 32:
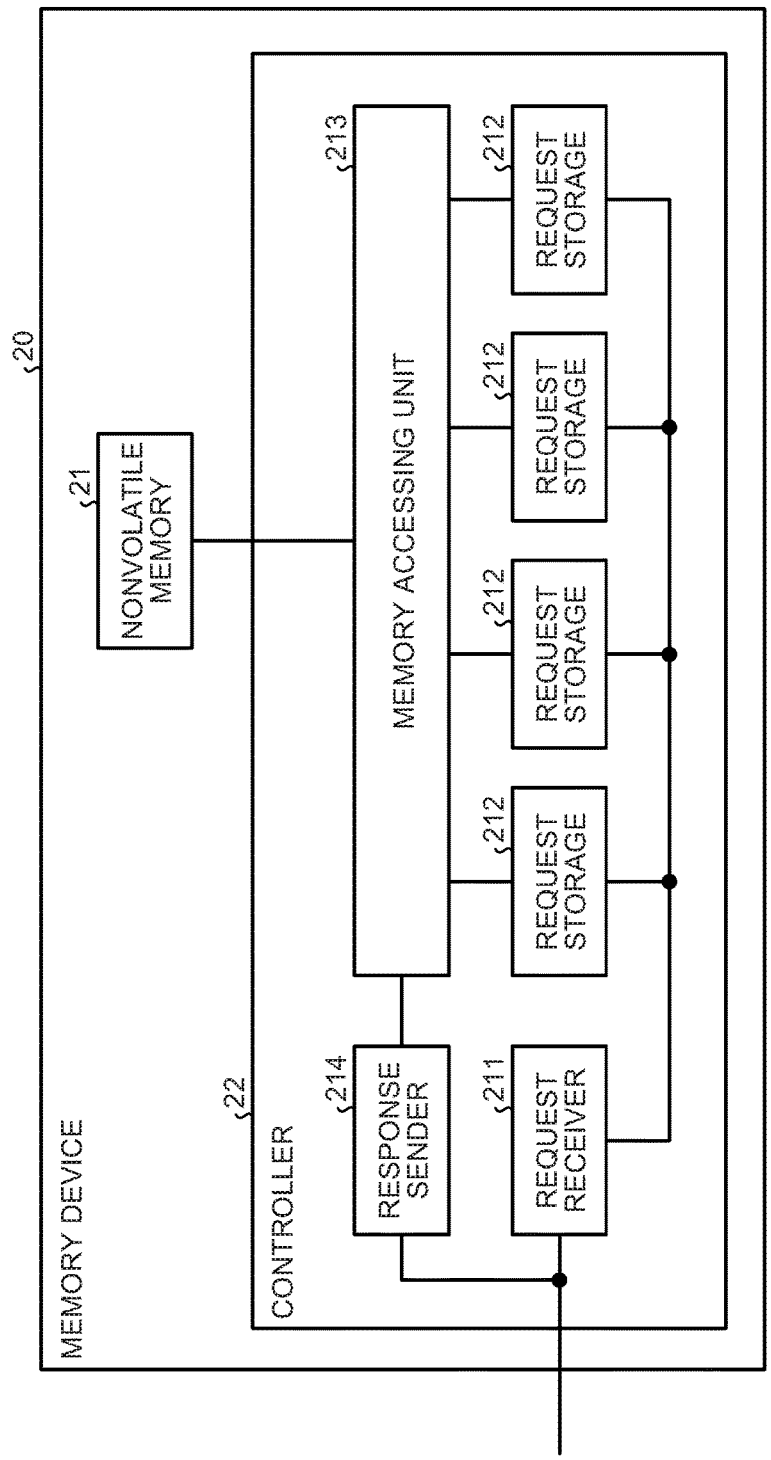
FIG. 32 is a diagram illustrating an exemplary configuration of the memory device according to a modification example.

Meanwhile, for example, as illustrated in FIG. 32, it is possible to have a dedicated request storage 212 for each block. In FIG. 32 is illustrated a configuration in which the memory device 20, which includes the nonvolatile memory 21 made of four blocks as illustrated in FIG. 28, includes four request storages 212 on a one-to-one basis with the four blocks.

Figure 33:
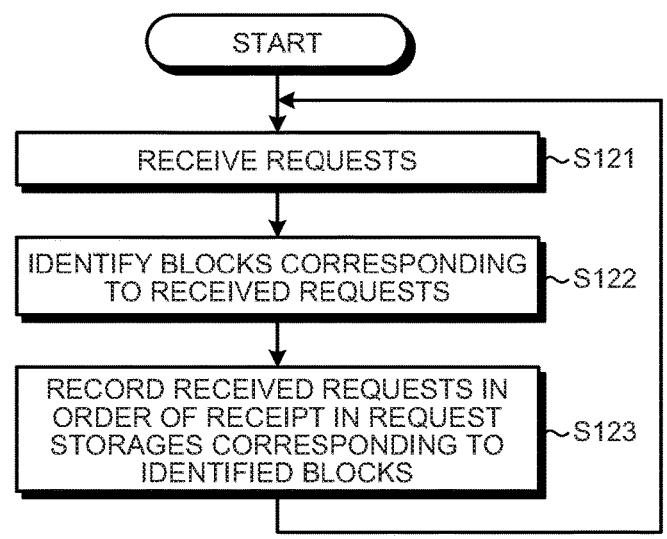
FIG. 33 is a flowchart for explaining an example of the operations performed by the request receiver according to a modification example.

FIG. 33 is a flowchart for explaining an example of the operations performed by the request receiver 211 present in the configuration illustrated in FIG. 32. When requests are received from the processor 10 (Step S121), the request receiver 211 identifies the blocks corresponding to the received requests based on the address information included in the received requests (Step S122). Then, the request receiver 211 records the received requests in the order of receipt in the request storages 212 corresponding to the identified blocks (Step S123). Since a request received from the processor 10 is put in the block corresponding to that request, the memory accessing unit 213 having the configuration illustrated in FIG. 32 need not hold the information indicating the correspondence between the address information and the blocks; and can process requests according to the sequence of operations illustrated in FIG. 12 (in this example, the sequence of operations identical to the first embodiment) with respect to each of a plurality of request storages 212 (i.e., from a different standpoint, with respect to each of a plurality of blocks).

Figure 34:
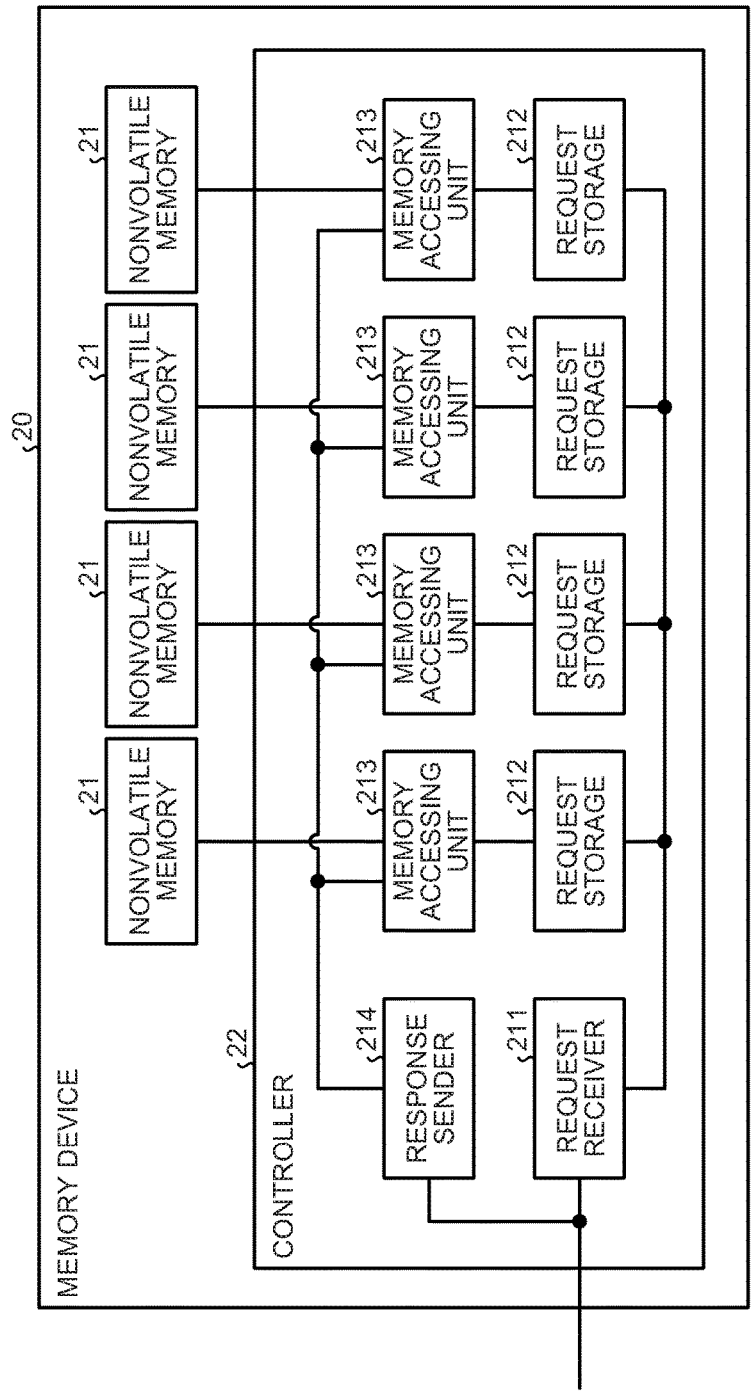
FIG. 34 is a diagram illustrating an exemplary configuration of the memory device according to modification examples.

Alternatively, for example, as illustrated in FIG. 34, when the memory device 20 includes a plurality of nonvolatile memories 21 each of which represents a block, it is possible to have a dedicated request storage 212 and a dedicated memory accessing unit 213 for each nonvolatile memory 21 (for each block). In FIG. 34 is illustrated a configuration in which four request storages 212 and four memory accessing units 213 are disposed corresponding to the four blocks represented by the four nonvolatile memories 21. In this case, the request receiver 211 follows the sequence of operations illustrated in FIG. 33, and stores the requests received from the processor 10 into the request storages 212 meant for the blocks to which the requests correspond. Hence, regarding the requests that are stored in the request storage 212 meant for each block, the corresponding memory accessing unit 213 can process those requests according to the sequence of operations illustrated in FIG. 12 (in this example, the sequence of operations identical to the first embodiment).

Figure 35:
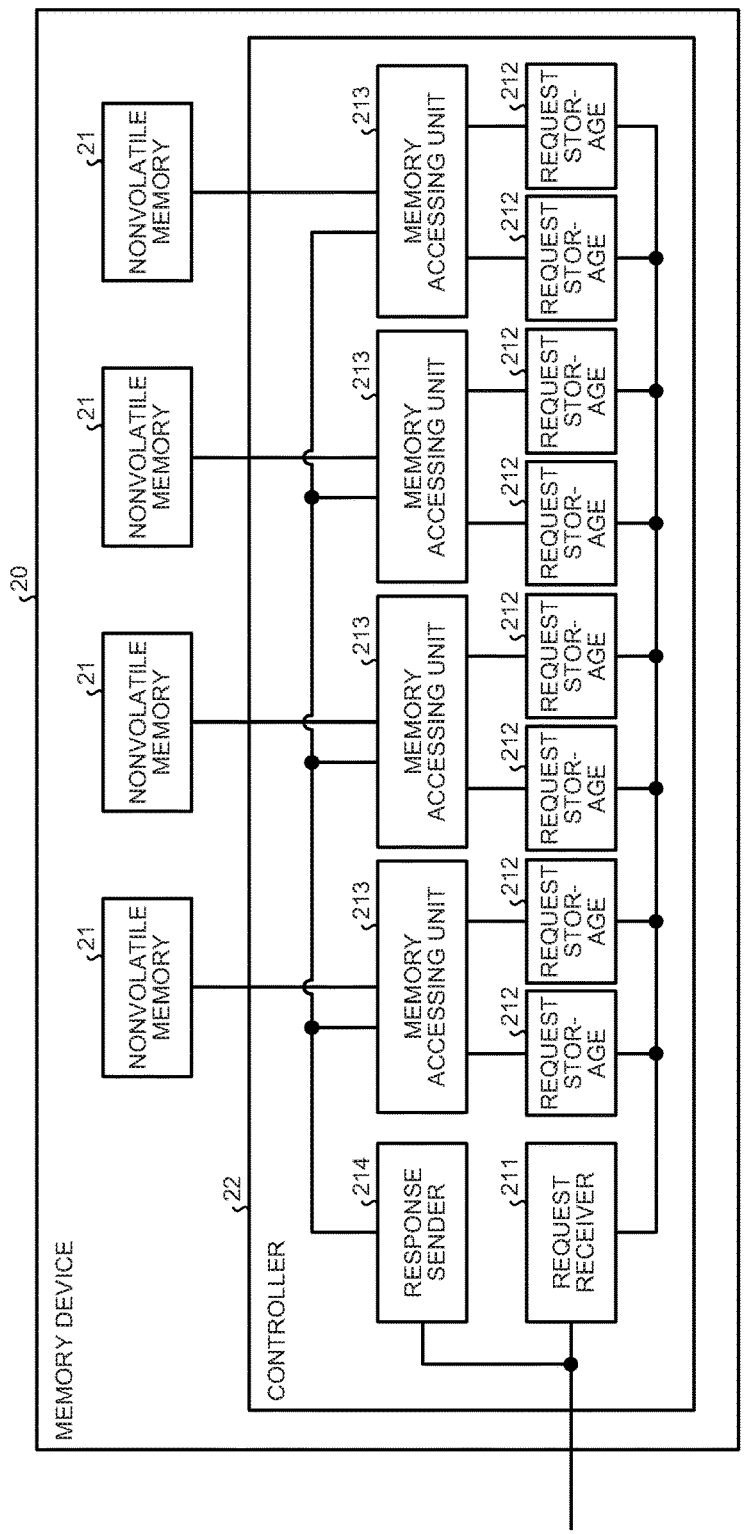
FIG. 35 is a diagram illustrating an exemplary configuration of the memory device according to modification examples.

In FIG. 35 is illustrated a modification example of the configuration illustrated in FIG. 34. That is, in FIG. 35 is illustrated a case in which four nonvolatile memories 21 installed in the memory device 20 have eight blocks as illustrated in FIG. 29, and each nonvolatile memory 21 has two blocks corresponding thereto. In the example illustrated in FIG. 35, to each of the four memory accessing units 213 corresponding to the four nonvolatile memories 21 on a one-to-one basis, a plurality of (in this example, two) request storages 212 is assigned. Each memory accessing unit 213 treats, as the processing targets, all requests stored in the two nonvolatile memories 21 assigned to that memory accessing unit 213, and can process those requests according to the sequence of operations illustrated in FIG. 12 (in this example, the sequence of operations identical to the first embodiment).

In essence, in the seventh embodiment, when a writing order confirmation request, which requests confirmation of the fact that data writing is performed based on one or more already-sent write requests corresponding to a target block (a target area) representing one of a plurality of blocks (i.e., an ordering request corresponding to the target block), is received from the processor 10; the controller 22 sends to the processor 10 a response with respect to the writing order confirmation request only after performing data writing based on the one or more write requests corresponding to the target block. As the specific operation details, it is possible to think in an identical manner to the first embodiment. Meanwhile, each of a plurality of blocks can represent an area obtained by partitioning the address space of the nonvolatile memory 21 according to a predetermined size, or can represent an area obtained by dividing the address space of the nonvolatile memory 21 in an arbitrary manner. The controller 22 sets the range of addresses corresponding to each of a plurality of blocks.

Meanwhile, in the seventh embodiment, the memory accessing unit 213 can process the requests according to, for example, the sequence of operations illustrated in FIG. 23 (the sequence of operations identical to the second embodiment) instead of following the sequence of operations illustrated in FIG. 12. In essence, the memory accessing unit 213 can process the requests as follows. The write requests include non-posted write requests and posted write requests, and when a first write request, which represents a non-posted write request corresponding to the target block that is one of a plurality of blocks, is received from the processor 10; the controller 22 performs data writing based on the first write request after performing data writing based on one or more posted write requests corresponding to the target block, and then sends to the processor 10 a response with respect to the first write request. As the specific operation details, it is possible to think in an identical manner to the second embodiment.

For example, of one or more write requests included in the first writing set that represents a set of one or more write requests corresponding to the target block and that is considered for data writing earlier than the second writing set representing a set of one or more write requests corresponding to the target block, the last write request sent to the memory device 20 can be the first write request and the remaining requests can be posted write requests. Alternatively, one or more write requests included in the first writing set corresponding to the target block can be posted write requests; and, of one or more write requests included in the second writing set that represents a set of one or more write requests corresponding to the target block and that is considered for data writing after the first writing set, the first write request sent to the memory device 20 can be the first write request and the remaining requests can be posted write requests.

Meanwhile, in the seventh embodiment, the memory accessing unit 213 can process the requests according to, for example, the sequence of operations illustrated in FIG. 24 (the sequence of operations identical to the third embodiment). In essence, in an identical manner to the third embodiment, the write requests include non-posted write requests, each of which requires a response with respect to the write request to be sent to the processor 10 after data writing based on the write request is completed, and posted write requests. In an identical manner to the third embodiment, when a non-posted write request is received from the processor 10, the controller 22 performs both data writing based on the posted write requests received before receiving the non-posted write request and data writing based on the non-posted write request; and then sends to the processor 10 a response with respect to the non-posted write request. For example, the controller 22 retrieves a second write request, which corresponds to the target block representing one of a plurality of blocks and which is stored in the request storage 212 in association with the flag information set to indicate that data writing is not performed; performs data writing based on the retrieved second write request; associates the second write request with flag information set to indicate that data writing is performed; stores back the second write request at the original position in the request storage 212; performs data writing based on the write requests corresponding to the target area and received before receiving the second write request; and then sends to the processor 10 a response with respect to the second write request. As the specific operation details, it is possible to think in an identical manner to the third embodiment.

For example, of one or more write requests included in the first writing set that represents a set of one or more write requests corresponding to the target area and that is considered for data writing earlier than the second writing set representing a set of one or more write requests corresponding to the target area, the last write request sent to the memory device 20 can be the second write request and the remaining write requests can be posted write requests.

Meanwhile, in the seventh embodiment, the memory accessing unit 213 can process the requests according to, for example, the sequence of operations illustrated in FIG. 25 (the sequence of operations identical to the fourth embodiment). In essence, when a specific read request for reading data from specific positions (addresses) of the target block, which is one of a plurality of blocks, is received from the processor 10; the controller 22 can perform data reading based on the specific read request after performing data writing based on the write requests corresponding to the target block and received before receiving the specific read request, and send to the processor 10 a response with respect to the specific read request. As the specific operation details, it is possible to think in an identical manner to the fourth embodiment.

Meanwhile, in the seventh embodiment, the memory accessing unit 213 can process the requests according to, for example, the sequence of operations illustrated in FIG. 26 (the sequence of operations identical to the fifth embodiment). In essence, when a specific write request for writing data at specific positions of the target block, which is one of a plurality of blocks, is received from the processor 10; the controller 22 can perform data writing based on the specific write request after performing data writing based on one or more write requests corresponding to the target block and received before receiving the specific write request, and send to the processor 10 a response with respect to the specific write request. As the specific operation details, it is possible to think in an identical manner to the fifth embodiment.

For example, of one or more write requests included in the first writing set that represents a set of one or more write requests corresponding to the target block (target area) and that is considered for data writing earlier than the second writing set representing a set of one or more write requests corresponding to the target area, the last write request sent to the memory device 20 can be the specific write request.

Alternatively, for example, of one or more write requests included in the second writing set that represents a set of one or more write requests corresponding to the target area and that is considered for data writing after the first writing set representing a set of one or more write requests corresponding to the target area, the first write request sent to the memory device 20 can be the specific write request. Then, a response with respect to the specific write request is awaited before issuing the remaining write requests to the memory device 20.

Meanwhile, in the seventh embodiment, the memory accessing unit 213 can process the requests according to, for example, the sequence of operations illustrated in FIG. 27 (the sequence of operations identical to the sixth embodiment). In essence, when a specific write request for writing data at specific positions of the target block, which is one of a plurality of blocks, is issued; it is required to send to the processor 10 a response with respect to the specific write request after data writing based on the specific write request is performed. Then, in an identical manner to the sixth embodiment, when a specific write request is received from the processor 10, the controller 22 performs both of data writing based on the write requests received before receiving the specific write request and data writing based on the specific write request; and sends to the processor 10 a response with respect to the specific write request. For example, the configuration can be such that the controller 22 retrieves the specific write request, which is stored in the request storage 212 in association with the flag information set to indicate that the data writing is not performed; performs data writing based on the retrieved specific write request; associates the specific write request with flag information set to indicate that data writing is performed; stores back the specific write request at the original position in the request storage 212; performs data writing based on one or more write requests corresponding to the target block and received before receiving the specific write request; and then sends to the processor 10 a response with respect to the specific write request. As the specific operation details, it is possible to think in an identical manner to the sixth embodiment.

For example, of one or more write requests included in the first writing set that represents a set of one or more write requests corresponding to the target block and that is considered for data writing earlier than the second writing set representing a set of one or more write requests corresponding to the target block, the last write request sent to the memory device 20 can be the specific write request.

Eighth Embodiment

Given below is the explanation of an eighth embodiment. Herein, regarding the common portion with the first to seventh embodiments, the explanation is not repeated. As compared to the embodiments described above, the eighth embodiment differs in the way that a write request includes group identification information (in the following explanation, sometimes referred to as a "group ID") that enables identification of the group representing a set of one or more operations that include the operation corresponding to the write request; and a configuration is adopted for ensuring that the writing order (i.e., ordering) is followed among the writing sets in each group. Moreover, unlike the seventh embodiment, the writing destination of the data corresponding to the same group can be any area in the nonvolatile memory 21 (i.e., the data does not need to be stored in the same block). Hence, as compared to the seventh embodiment, the nonvolatile memory 21 can be managed in a more flexible manner.

FIG. 36 is a diagram illustrating an exemplary format of a request according to the eighth embodiment. In the example illustrated in FIG. 36, the request further includes the group ID that enables identification of the target group. FIG. 37 is a diagram illustrating an example of a writing order confirmation request (an ordering request) according to the eighth embodiment. In the writing order confirmation request illustrated in FIG. 37, information enabling identification of the fact that the request is a writing order confirmation request (in the example illustrated in FIG. 37, "ORDERING REQUEST") is specified as the command information. Moreover, in the example illustrated in FIG. 37, the number "7" is specified as the tag information, while the number "5" is specified as the group ID. Thus, the writing order confirmation request illustrated in FIG. 37 can be considered to be information for requesting confirmation of the fact that data writing based on one or more already-sent write requests corresponding to the group identified by the group ID "5" has been performed. In the eighth embodiment, read requests as well as write requests include the group ID.

For example, in the configuration in which the memory device 20 according to the eighth embodiment includes a single request storage 212 and a single memory accessing unit 213 as illustrated in FIG. 10, the memory accessing unit 213 refers to the group IDs included in the requests stored in the request storage 212, and determines the group to which each request belongs (corresponds). That is, based on the group IDs included in the requests that are stored in the request storage 212, the memory accessing unit 213 classifies the requests on a group-by-group basis. Then, for each group, the memory accessing unit 213 treats all requests corresponding to that group as the processing targets and processes those requests according to the sequence of operations illustrated in FIG. 12 (in this example, the sequence of operations identical to the first embodiment). At that time, particular blocks may be processed with priority, or all blocks may be processed impartially.

Figure 38:
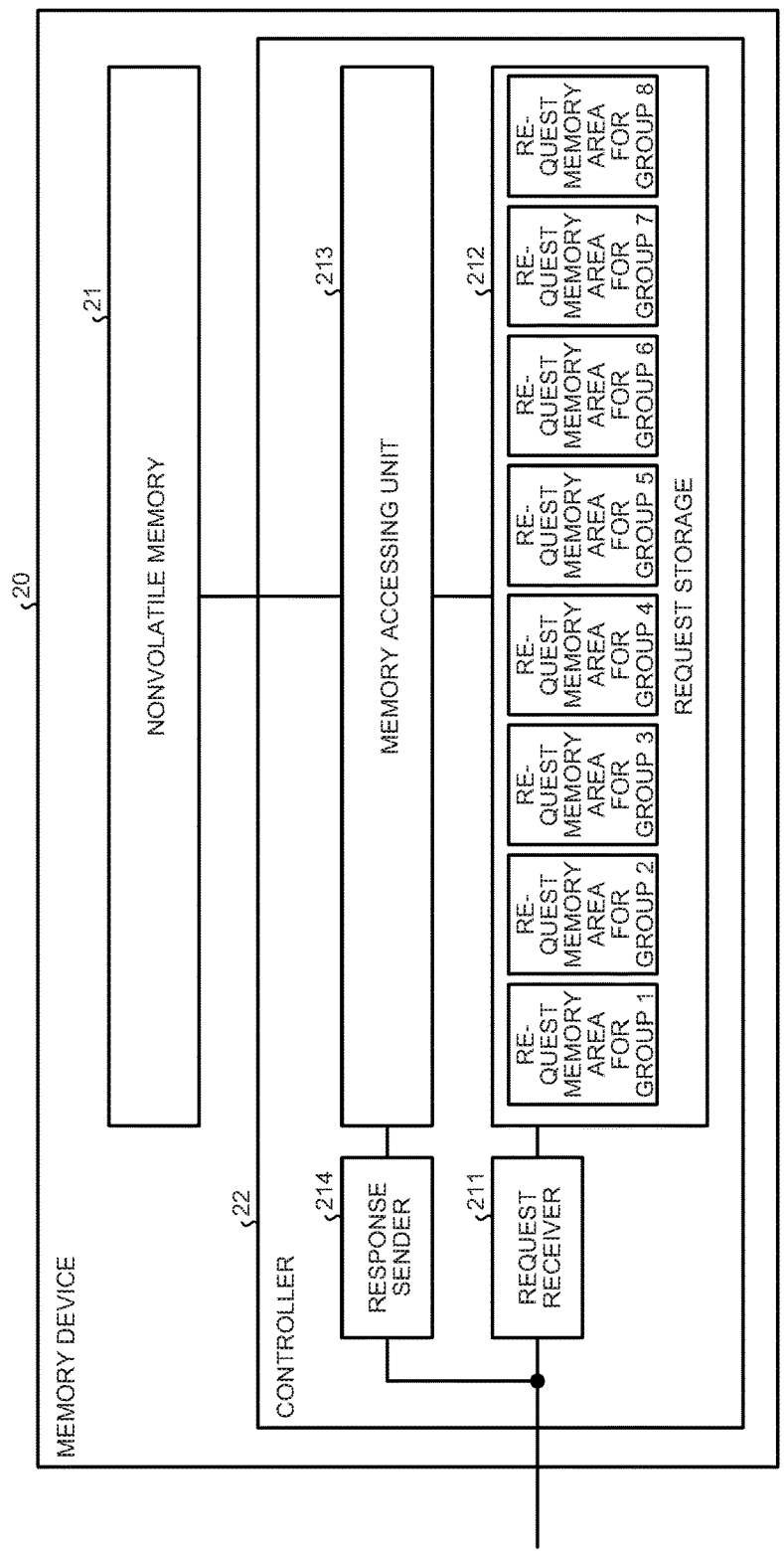
FIG. 38 is a diagram illustrating an exemplary configuration of the memory device according to a modification example.

Meanwhile, for example, as illustrated in FIG. 38, the request storage 212 can be configured to include a plurality of memory areas for groups (in the example illustrated in FIG. 38, eight memory areas) corresponding to a plurality of groups on a one-to-one basis.

Figure 39:
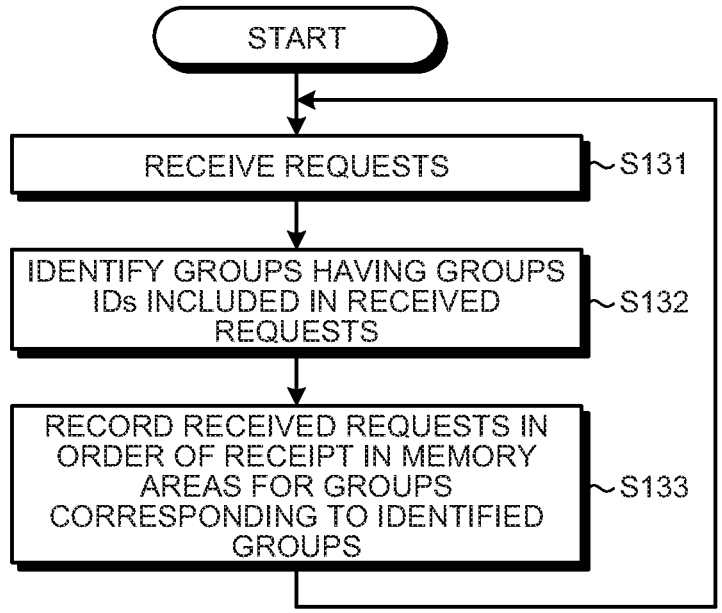
FIG. 39 is a flowchart for explaining an example of the operations performed by the request receiver according to a modification example.

FIG. 39 is a flowchart for explaining an example of the operations performed by the request receiver 211 present in the configuration illustrated in FIG. 38. When requests are received from the processor 10 (Step S131), the request receiver 211 identifies the groups identified by the group IDs included in the received requests (Step S132). Then, the request receiver 211 records the received requests in the order of receipt in the memory areas for groups corresponding to the identified groups (Step S133).

For each of a plurality of memory areas for groups (i.e., from a different standpoint, with respect to each of a plurality of groups), the memory accessing unit 213 in the configuration illustrated in FIG. 38 can process requests according to the sequence of operations illustrated in FIG. 12 (in this example, the sequence of operations identical to the first embodiment).

In essence, in the eighth embodiment, a write request includes group identification information (a group ID) that enables identification of the group representing a set of one or more operations that include the operation corresponding to the write request. When a writing order confirmation request, which requests confirmation of the fact that data writing is performed based on one or more already-sent write requests including target group identification information that is one of the pieces of group identification information, is received from the processor 10; the controller 22 performs data writing based on the one or more write requests including the target group identification information and received before receiving the writing order confirmation request, and then sends to the processor 10 a response with respect to the writing order confirmation request. As the specific operation details, it is possible to think in an identical manner to the first embodiment.

Meanwhile, in the eighth embodiment, the memory accessing unit 213 can process the requests according to, for example, the sequence of operations illustrated in FIG. 23 (the sequence of operations identical to the second embodiment) instead of following the sequence of operations illustrated in FIG. 12. In essence, a write request includes the group identification information that enables identification of the group representing a set of one or more operations that include the operation corresponding to the concerned write requests. Besides, in an identical manner to the second embodiment, the write requests include non-posted write requests and posted write requests. When a third write request, which represents a non-posted write request including the target group identification information representing one of the pieces of group identification information, is received from the processor 10; the controller 22 can perform data writing based on the third write request after performing data writing based on the posted write requests including group identification information and received before receiving the third write request, and then send to the processor 10 a response with respect to the third write request. As the specific operation details, it is possible to think in an identical manner to the second embodiment.

For example, the configuration can be such that, of one or more write requests included in the first writing set that represents a set of one or more write requests including the target group identification information and that is considered for data writing earlier than the second writing set representing a set of one or more write requests including the target group identification information, the last write request sent to the memory device 20 can be the third write request.

Meanwhile, for example, one or more write requests included in the first writing set, which represents a set of one or more write requests including the target group identification information, can be posted write requests; and, of one or more write requests included in the second writing set, which represents a set of one or more write requests including the target group identification information and which is considered for data writing after the first writing set, the first write request sent to the memory device 20 can be the third write request. Then, a response with respect to the third write request is awaited before issuing the remaining write requests included in the second writing set.

Meanwhile, in the eighth embodiment, the memory accessing unit 213 can process the requests according to, for example, the sequence of operations illustrated in FIG. 24 (the sequence of operations identical to the third embodiment). In essence, a write request includes the group identification information that enables identification of the group representing a set of one or more operations that include the operation corresponding to the write request. Moreover, in an identical manner to the third embodiment, the write requests include non-posted write requests and posted write requests. Furthermore, in an identical manner to the third embodiment, when a non-posted write request is received from the processor 10, the controller 22 performs both of data writing based on the posted write requests received before receiving the non-posted write request and data writing based on the non-posted write request; and then sends to the processor 10 a response with respect to the non-posted write request. For example, the controller 22 retrieves a fourth write request, which represents a non-posted write request that includes the target group identification information indicating one of the pieces of group identification information and that is stored in the request storage 212 in association with the flag information set to indicate that data writing is not performed; performs data writing based on the retrieved fourth write request; associates the fourth write request with flag information set to indicate that data writing is performed; stores back the fourth write request at the original position in the request storage 212; performs data writing based on the write requests including the target group identification information and received before receiving the fourth write request; and then sends to the host device a response with respect to the fourth write request. As the specific operation details, it is possible to think in an identical manner to the third embodiment.

For example, of one or more write requests included in the first writing set that represents a set of one or more write requests including the target group identification information and that is considered for data writing earlier than the second writing set representing a set of one or more write requests including the target group identification information, the last write request sent to the memory device 20 can be the fourth write request and the remaining write requests can be posted write requests.

Meanwhile, in the eighth embodiment, the memory accessing unit 213 can process the requests according to, for example, the sequence of operations illustrated in FIG. 25 (the sequence of operations identical to the fourth embodiment). In essence, when a specific read request, which includes the target group identification information indicating one of the pieces of group identification information and which is issued for reading data from specific positions (addresses) in the nonvolatile memory 21, is received from the processor 10, the controller 22 performs data writing based on the write requests including the target group identification information and received before receiving the specific read request; performs data reading based on the specific read request; and sends to the processor 10 a response with respect to the specific read request. As the specific operation details, it is possible to think in an identical manner to the fourth embodiment.

Meanwhile, in the eighth embodiment, the memory accessing unit 213 can process the requests according to, for example, the sequence of operations illustrated in FIG. 26 (the sequence of operations identical to the fifth embodiment). In essence, a write request includes the group identification information enabling identification of the group representing a set of one or more operations that include the operation corresponding to the write request. When a specific write request, which includes the target group identification information indicating one of the pieces of group identification information and which is issued for writing data at specific positions (addresses) in the nonvolatile memory 21, is received from the processor 10; the controller 22 performs data writing based on the specific write request after performing data writing based on one or more write requests including the target group identification information and received before receiving the specific write request, and sends to the processor 10 a response with respect to the specific write request. As the specific operation details, it is possible to think in an identical manner to the fifth embodiment.

For example, of one or more write requests included in the first writing set that represents a set of one or more write requests including the target group identification information and that is considered for data writing earlier than the second writing set representing a set of one or more write requests including the target group identification information, the last write request sent to the memory device 20 can be the specific write request.

Alternatively, for example, of one or more write requests included in the second writing set that represents a set of one or more write requests including the target group identification information and that is considered for data writing after the first writing set representing a set of one or more write requests including the target group identification information, the first write request sent to the memory device 20 can be the specific write request.

Meanwhile, in the eighth embodiment, the memory accessing unit 213 can process the requests according to, for example, the sequence of operations illustrated in FIG. 27 (the sequence of operations identical to the sixth embodiment). In essence, when a specific write request, which includes the target group identification information indicating one of the pieces of group identification information and which is issued for writing data at specific positions (addresses) in the nonvolatile memory 21, is issued; it is required to send to the processor 10 a response with respect to the specific write request after data writing based on the specific write request is performed. Then, in an identical manner to the sixth embodiment, when a specific write request is received from the processor 10, the controller 22 performs data writing based on the write requests received before receiving the specific write request; performs data writing based on the specific write request; and sends to the processor 10 a response with respect to the specific write request. For example, the configuration can be such that the controller 22 retrieves the specific write request, which is stored in the request storage 212 in association with the flag information set to indicate that the data writing is not performed; performs data writing based on the retrieved specific write request; associates the specific write request with flag information set to indicate that data writing is performed; stores back the specific write request at the original position in the request storage 212; performs data writing based on one or more write requests including the target group identification information and received before receiving the specific write request; and then sends to the processor 10 a response with respect to the specific write request. As the specific operation details, it is possible to think in an identical manner to the sixth embodiment.

For example, of one or more write requests included in the first writing set that represents a set of one or more write requests including the target group identification information and that is considered for data writing earlier than the second writing set representing a set of one or more write requests including the target group identification information, the last write request sent to the memory device 20 can be the specific write request.

Moreover, the embodiments and the modification examples described above can be combined in an arbitrary manner.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device external to a host device, the memory device comprising:
 a nonvolatile memory; and
 a controller that manages a write request with respect to the nonvolatile memory in a state that allows confirmation of order of receipt from the host device and that performs data writing with respect to the nonvolatile memory based on the write request managed, wherein
 the write request is either a non-posted write request, which requests a response with respect to the write request to be sent to the host device after data writing based on the write request is performed, or a posted write request, which does not request a response with respect to the write request to be sent to the host device after data writing based on the write request is performed, and
 the non-posted write request is stored at a position in a storage area in the controller;
 the controller restores the non-posted write request at the position after data writing based upon the non-posted write request;
 the controller performs data writing based on the posted write request received before receiving the non-posted write request; and
 the controller sends to the host device a response with respect to the non-posted write request.

2. The device according to claim 1, wherein the controller retrieves the non-posted write request.

3. The device according to claim 1, wherein the controller retrieves the non-posted write request including first flag information indicating that data writing is not performed;
 performs the data writing based on the non-posted write request;
 associates the non-posted write request with second flag information indicating that data writing is performed; and
 stores the non-posted write request with the second flag information at the position in the storage area.

4. The device according to claim 1, wherein when the non-posted write request is received from the host device, the controller performs data writing based on the non-posted write request followed by data writing based on every posted write request received before receiving the non-posted write request, and then sends to the host device a response with respect to the non-posted write request.

5. The device according to claim 3, wherein when the non-posted write request associated with the second flag information is stored in the storage area and when every request received before receiving the non-posted write request associated with the second flag information is a read request, the controller retrieves the non-posted write request associated with the second flag information from the storage area and sends a response with respect to the retrieved write request to the host device.

6. The device according to claim 3, wherein when the posted write request or the non-posted write request that is not associated with the second flag information is stored in the storage area as the request received before receiving the non-posted write request associated with the second flag information, the controller retrieves the posted write request or the non-posted write request that is not associated with the second flag information from the storage area and performs processing according to the retrieved request.

7. The device according to claim 6, wherein the controller retrieves, from among the posted write request or the non-posted write request that is not associated with the second flag information stored in the storage area, whichever is received earliest.

8. The device according to claim 6, wherein when the controller retrieves the non-posted write request that is not associated with the second flag information from the storage area, the controller performs data writing based on the retrieved non-posted write request, associates the non-posted write request with the second flag information, and stores the non-posted write request at the position in the storage area.

9. A method of controlling a nonvolatile memory, the method comprising:
    managing a write request with respect to the nonvolatile memory in a state that allows confirmation of order of receipt from a host device and that performs data writing with respect to the nonvolatile memory based on the write request managed, the write request being either a non-posted write request or a posted write request, the non-posted write request requesting a response with respect to the write request to be sent to the host device after data writing based on the write request is performed, the posted write request not requesting a response with respect to the write request to be sent to the host device after data writing based on the write request is performed;
    storing the non-posted write request at a position in a storage area;
    restoring the non-posted write request at the position after data writing based upon the non-posted write request;
    performing data writing based on the posted write request received before receiving the non-posted write request; and
    sending to the host device a response with respect to the non-posted write request.

10. The method according to claim 9, wherein the storage area is in a controller that controls the nonvolatile memory.

11. The method according to claim 9, further comprising retrieving the non-posted write request.

12. The method according to claim 9, further comprising
    retrieving the non-posted write request including first flag information indicating that data writing is not performed;
    performing the data writing based on the non-posted write request;
    associating the non-posted write request with second flag information indicating that data writing is performed; and
    storing the non-posted write request with the second flag information at the position in the storage area.

13. The method according to claim 9, further comprising
    when the non-posted write request is received from the host device, performing data writing based on the non-posted write request followed by data writing based on every posted write request received before receiving the non-posted write request, and then sending to the host device a response with respect to the non-posted write request.

14. The method according to claim 12, further comprising
    when the non-posted write request associated with the second flag information is stored in the storage area and when every request received before receiving the non-posted write request associated with the second flag information is a read request, retrieving the non-posted write request associated with the second flag information from the storage area and sending a response with respect to the retrieved write request to the host device.

15. The method according to claim 12, further comprising
    when the posted write request or the non-posted write request that is not associated with the second flag information is stored in the storage area as the request received before receiving the non-posted write request associated with the second flag information, retrieving the posted write request or the non-posted write request that is not associated with the second flag information from the storage area and performing processing according to the retrieved request.

16. The method according to claim 15, wherein the retrieving includes retrieving, from among the posted write request or the non-posted write request that is not associated with the second flag information stored in the storage area, whichever is received earliest.

17. The method according to claim 15, further comprising
    when the non-posted write request that is not associated with the second flag information is retrieved from the storage area at the retrieving,
    performing data writing based on the retrieved non-posted write request;
    associating the non-posted write request with the second flag information; and
    storing the non-posted write request at the position in the storage area.

* * * * *